United States Patent
Higuchi et al.

[11] Patent Number: 5,914,759
[45] Date of Patent: Jun. 22, 1999

[54] SURFACE LIGHT SOURCE DEVICE, LIQUID CRYSTAL DISPLAY AND ASYMMETRIC PRISM SHEET

[75] Inventors: Eizaburo Higuchi, Setagaya; Yasuhiro Koike, Yokohama, both of Japan

[73] Assignee: Nitto Jushi Kogyo Kabushiki Kaisha, Tokyo, Japan

[21] Appl. No.: 08/930,283

[22] PCT Filed: Feb. 7, 1997

[86] PCT No.: PCT/JP97/00328

§ 371 Date: Sep. 30, 1997

§ 102(e) Date: Sep. 30, 1997

[87] PCT Pub. No.: WO97/29398

PCT Pub. Date: Aug. 14, 1997

[30] Foreign Application Priority Data

Feb. 7, 1996 [JP] Japan .................................. 8-044076

[51] Int. Cl.[6] .................................................. G02F 1/1335
[52] U.S. Cl. ................................................ 349/57; 349/64
[58] Field of Search .................................. 349/57, 64, 65

[56] References Cited

U.S. PATENT DOCUMENTS

| 5,598,280 | 1/1997 | Nishio et al. ............................... 349/57 |
| 5,600,455 | 2/1997 | Ishikawa et al. ........................... 349/57 |
| 5,694,186 | 12/1997 | Yanagawa et al. ........................ 349/57 |
| 5,838,403 | 11/1998 | Jannson et al. ............................ 349/64 |

FOREIGN PATENT DOCUMENTS

| 0 785 458 | 7/1997 | European Pat. Off. . |
| 5-173134 | 7/1993 | Japan . |
| 6-27325 | 2/1994 | Japan . |
| 7-270708 | 10/1995 | Japan . |

*Primary Examiner*—Tiep H. Nguyen
*Attorney, Agent, or Firm*—Staas & Halsey

[57] ABSTRACT

A fluorescent lamp L is arranged in the vicinity of an incidence surface 2 of a light scattering guide plate 1. A prism sheet 4' having rows of prism elements and rows of lens elements on each side is arranged outside an exiting surface 5. The angles of inclination of slopes 4a and 4b satisfy a condition that $\phi a > \phi b$. The slopes 4a and 4b extend in the transverse direction of the light scattering guide plate 1, and slopes 4c and 4d extend in the longitudinal direction. A reflector 3 is arranged along a rear surface 6. Light emitted from the exiting surface 5 is efficiently propagated by an inner prism surface toward a forward direction, shifted in the transverse direction by an outer prism surface or the lens element surfaces 4c and 4d, and is then returned inwardly. The path histories of light emitted from the prism sheet 4' is diversified to improve visual characteristics. The peak level of brightness as viewed in the forward direction is improved and brightness is smoothly reduced according to deviation from the peak direction.

24 Claims, 13 Drawing Sheets

$\phi 0 = \frac{1}{2} \times$ APEX ANGLE $\phi b > \phi a$ $\phi a = 15°$ $\phi b = 32.5°$ $\theta 1 = 12°$ $\theta 2 = 8°$ $\theta 3 = 34.5°$ $\theta 4 = 91.5°$ Peak = 63deg.

F I G. 1 7
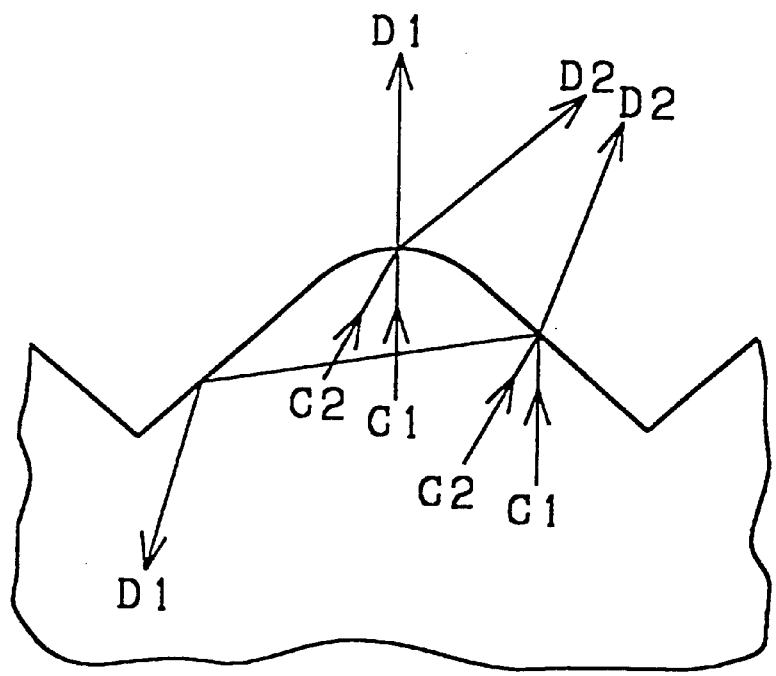
F I G. 1 8
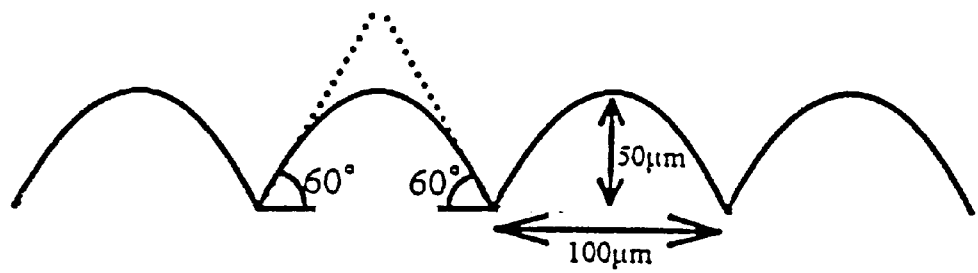

SURFACE LIGHT SOURCE DEVICE, LIQUID CRYSTAL DISPLAY AND ASYMMETRIC PRISM SHEET

TECHNICAL FIELD

The present invention relates to a surface light source device utilizing a light scattering guide plate (a plate-like light scattering guide), a liquid crystal display utilizing the same for back lighting, and an asymmetric prism sheet which can be advantageously used for them. In the present specification, the term "asymmetric prism sheet" means "a sheet-like optical element including a prism surface formed by a multiplicity of rows of asymmetric prism elements".

BACKGROUND OF THE INVENTION

Light source devices utilizing a light scattering guide plate and a prism sheet have been proposed and put in use for purposes such as back-lighting for liquid crystal displays. A conventional prism sheet is constituted by a plate-like member made of an optical material having a prism surface formed with repetitive rows of V-shaped irregularity. It is known that such a prism sheet has a function of modifying the directional propagation characteristics of a beam.

FIG. 1 shows a general arrangement of a conventional surface light source device utilizing a light scattering guide plate and a prism sheet. A light scattering guide plate 1 having a wedge-like section comprises a matrix made of polymethyl methacrylate (PMMA) and a material of a different refractive index mixed and dispersed uniformly in the matrix. The term "material of a different refractive index" means a material having a refractive index which is substantially different from the refractive index of the matrix.

One of the end faces that define the larger thickness of the light scattering guide plate 1 serves as an incidence surface 2, and a light source device (fluorescent lamp) L is arranged in the vicinity of the same.

A reflector 3 is arranged along one surface (rear surface 6) of the light scattering guide plate 1. The reflector 3 is constituted by a sheet of silver foil having regular reflectivity or a white sheet having diffuse reflectivity. Illuminating light is obtained at an exiting surface 5 on the other side of the light scattering guide plate 1. The prism sheet 4 is arranged outside the exiting surface 5.

For convenience in illustration, the interval between the light scattering guide plate 1 and the rows of the prism elements and the pitch and depth of the rows of prism elements are exaggerated. The inner surface of the prism sheet 4 is a prism surface formed by repetitive symmetric V-shaped slopes 4a and 4b. The outer surface of the prism sheet 4 constitutes a flat surface (luminous surface) 4e from which an illuminating beam 4f emits. A back-lighting configuration for a liquid crystal display can be arranged by disposing a well-known liquid crystal display panel outside the prism sheet 4.

Thickness of the light scattering guide plate 1 decreases as distance from the incidence surface 2 increases. Thus, repetitive reflection occurs in an effective manner within the light scattering guide plate 1. As a result, the surface light source device has excellent light utilization efficiency and uniformity of luminance.

Light introduced from the light source device L into the light scattering guide plate 1 is guided toward an end face 7 that defines the larger thickness thereof while being subjected to scattering and reflection in the light scattering guide plate 1. During this process, illuminating light is gradually emitted from the exiting surface 5.

The light emitted from the exiting surface 5 has a preferred propagating direction that depends on the particle diameter of particles of a different refractive index dispersed in the light scattering guide plate 1 (in general terms, correlation distance associated with the structure having a non-uniform refractive index). In other words, the exiting surface 5 emits a beam which has been strongly or weakly collimated.

The greater the diameter of the particles of a different refractive index (in general terms, the greater the correlation distance associated with structure of non-uniform refractive index), the stronger the light emitted from the exiting surface 5 is collimated. The preferred propagating direction (the primary propagating direction of the illuminating beam) is normally a direction that defines an upward angle of about 25° to 30° with the exiting surface as viewed from the incidence surface 2.

Such a fact relates to the function of the prism sheet 4 of modifying directional propagation characteristics.

FIG. 2 is a view that illustrates the behavior of light in a section taken in the longitudinal direction of the configuration shown in FIG. 1. The term "longitudinal direction" refers to a direction which is parallel with the direction in which light is supplied to the light scattering guide plate 1 (i.e., perpendicular to the incidence surface 2). On the other hand, a direction which is perpendicular to the direction in which light is supplied to the light scattering guide plate 1 (i.e., parallel with the incidence surface 2) is referred to as "transverse direction".

Referring to FIG. 2, the prism sheet 4 is disposed along the exiting surface 5 of the light scattering guide plate 1 with the prism surface facing inwardly. A preferred angle $\phi 3$ of the apex angle of each of the prism elements that form the row of prism elements is about 60°.

When the direction of incidence is expressed by the arrow L', the preferred propagating direction of the beam emitted from exiting surface 5 defines an angle $\phi 2$=approximately 60° with the normal to the exiting surface 5.

If it is assumed to use PMMA (one of typical matrix materials having a refractive index n=1.492) as the matrix of the light scattering guide plate 1, an angle of incidence $\phi 1$=approximately 35° on the exiting surface 5 satisfies $\phi 2$=approximately 60°.

A beam that corresponds to such a preferred propagating direction is referred to as "representative beam". Here, the representative beam is indicated by the reference symbol B1.

The representative beam B1 emitted from the exiting surface 5 straightly travels a layer of air AR (having a refractive index n0=approximately 1.0) and thereafter impinges on one slope 4a of the prism sheet 4 at an angle close to perpendicularity ($\phi 3$=approximately 60°). The percentage of such beams incident upon another slope 4b is relatively low.

Next, the representative beam B1 substantially straightly travels in the prism sheet 4 up to the opposite slope 4b to be subjected to regular reflection. The beam which has been subjected to regular reflection impinges upon the flat surface 4e of the prism sheet 4 at an angle close to perpendicularity and exits from the prism sheet 4. This process modifies the preferred propagating direction of the beam emitted from the exiting surface 5 into a direction which is substantially perpendicular to the exiting surface 5.

However, the preferred propagating direction after the modification may be shifted from the direction perpendicular to the exiting surface 5. The shifting angle from the perpendicular direction can be adjusted to some degree depending on the apex angle $\phi 3$ of the prism sheet 4, the material (refractive index) of the prism sheet 4, and the material (refractive index) of the light scattering guide plate 1.

FIG. 3 shows another configuration of the prism sheet 4 and the behavior of light. In this configuration, the prism surface faces outwardly. For example, the apex angle $\phi 4$ of each prism element on the prism surface is approximately 70°.

In this configuration, the range of the apex angle that provides preferable results is wider than that in the above-described configuration wherein the prism surface faces inwardly.

If it is assumed that the direction of incidence is the direction indicated by the arrow L', a representative beam B2 corresponding to the preferred propagating direction is incident upon the exiting surface 5 at an angle $\phi 1$=approximately 35°. The beam is mostly emitted into the layer of air AR (having a refractive index n0=1.0). The emitting angle $\phi 2$ in this case is approximately 60°.

The representative beam B2 straightly travels through the layer of air AR and thereafter impinges upon the flat surface 4e of the prism sheet 4 at an angle. It follows a refraction path as illustrated and is emitted from one surface 4c of the prism sheet 4 at an angle close to perpendicularity to the exiting surface 5. The percentage of such beams that are emitted from another surface 4d is relatively low.

The path of the beam after the incidence upon the flat surface 4e of the prism sheet 4 varies depending on the refractive index n2 of the prism sheet 4 and the apex angle $\phi 4$ of the prism. Therefore, the preferred propagating direction can be adjusted by adjusting those parameters.

However, the conventional surface light source device described above does not satisfy all of requirements for the level and uniformity of the brightness of the luminous surface (the upper surface of the prism sheet) as viewed by naked eyes and sense of softness that the illumination gives.

In other words, the prior art has not been successful in providing a luminous surface that has fineness, gives no sense of glitter, and has sufficient whiteness. One significant problem is that the so-called reflective projection (the appearance of bright and dark regions originating from reflection). For example, such reflective projection adversely affects the display quality of a liquid crystal display.

This is assumed to be attributable to the following reason. The light scattering guide plate 1 in the configuration shown in FIG. 1 has not so strong scattering power from a visual point of view. This tendency becomes more significant for larger luminous surfaces for which weaker scattering power is chosen. As a result, a considerable amount of light is reflected by the reflector 3 disposed along the rear surface of the light scattering guide plate 1 to be incident upon the eyes of an observer without being dispersed sufficiently.

When a sheet having regular reflective properties such as a sheet of silver foil and a sheet of aluminum foil is used as the reflector 3, it gives a visual sense that is unique to a surface having regular reflection. Such a visual sense is accompanied by the so-called "lack of whiteness" and "lack of softness or a sense of glitter". Wrinkles or grooves are sometimes seen through the prism sheet.

It is assumed that such phenomena and the sense given by them to an observer are related not only to the level of light amount but also to composite factors such as color temperature and directional propagation characteristics of the illuminating beam.

The problem of whiteness can be mitigated to some extent by employing a white sheet having diffuse reflective properties as the reflector 3. However, this results in a reduction in the uniformity of brightness and the level of light amount of the luminous surface as a whole. Regardless of whether the reflector used has regular reflective properties or diffuse reflective properties, any unevenness (e.g., local wrinkles or irregularity) on the surface of the reflector 3 can cause appear as visible unevenness.

The inventor has made two proposals as follows in order to solve the above-described problems.

(1) A separate prism sheet is arranged along the rear surface of the light scattering guide plate. This prism sheet is oriented such that the rows of prism elements extend in parallel with the direction in which light is supplied (Japanese Patent Application No. H7-74671).

This first proposal solves the above-described problems. However, it requires two prism sheets, and improvement is still needed to achieve a compact structure and a lower manufacturing cost.

(2) Double-sided prism sheet is used as the prism sheet arranged on the side of the exiting surface of the light scattering guide plate (Japanese Patent Application No. H7-213964). This double-sided prism sheet is formed with rows of prism elements on both sides which are orthogonal to each other.

The prism sheet is oriented such that the rows of prism elements on the inner prism surface extend in parallel with the incidence surface and such that the rows of prism elements on the outer prism surface extends perpendicularly to the incidence surface.

The apex angle of the prisms on the inner prism surface is designed as an angle such that light propagating from the light scattering guide plate in the preferred propagating direction is guided in a substantially forward direction within the prism sheet.

On the contrary, the apex angle of the prisms on the outer prism surface is designed so that the light guided in a substantially forward direction within the prism sheet is shifted into a direction substantially perpendicular to the light supplying direction and is then reversed (returned). A typical value of such a prism apex angle is 90°, and the actual range for this angle is from about 70° to about 130°.

This second proposal has improved the level and uniformity of brightness, suppression of reflective reflection, and visual appearance (whiteness and softness) of the luminous surface while solving the problems which are not solved by the above-described first proposal.

However, increasingly higher quality is required for illuminating light used for purposes such as back-lighting of a liquid crystal display. Such demands include the following requirements that have recently arisen.

(1) Further improvement of the level of brightness of a display when viewed in a primary viewing direction (substantially forward direction).

(2) There is a demand for characteristics such that the level of brightness smoothly decreases with increase in an angular deviation from the primary viewing direction (substantially forward direction) and such that the output of illuminating light is suppressed as much as possible in viewing directions in which viewing is less likely to take place in order to avoid useless illumination. To satisfy such a demand, optical output must be suppressed as much as possible in directions which deviate from the forward direction by 30 deg. or more.

A surface light source device according to the above-described proposal for improvement is unsatisfactory in consideration to such demands. Particularly, it does not have performance that satisfies the demand as mentioned in the above item (2) as will be obvious from an embodiment for comparison to be described later.

The fact that useless illuminating light is output in directions that greatly deviate from the forward direction also indicates that there is still a need for improvement on the point described in the item (1).

DISCLOSURE OF THE INVENTION

It is a first object of the present invention to provide a surface light source device in which the level of brightness as viewed in a primary viewing direction (substantially forward direction) is improved.

It is a second object of the invention to provide a surface light source device in which the level of brightness smoothly decreases with increase in an angular deviation from the primary viewing direction (substantially forward direction) and in which useless output of illuminating light is suppressed in directions which greatly deviate from the substantially forward direction.

It is a third object of the invention to improve the applicability of a surface light source device to liquid crystal displays.

Further, a fourth object of the invention is to provide a novel prism sheet which can be used for such surface light source devices or liquid crystal displays.

A surface light source device according to the present invention comprises a light scattering guide plate, a primary light source means arranged on the side of the light scattering guide plate for supplying light toward an incidence surface of the light scattering guide plate, a prism sheet arranged along an exiting surface of the light scattering guide plate, and a reflector arranged along a surface opposite with the exiting surface.

The prism sheet arranged along the exiting surface is configured and arranged in accordance with the following conditions (1) through (6).

(1) The prism sheet includes rows of prism elements on a first surface (inner surface) thereof and rows of prism elements or lens elements on a second surface (outer surface) thereof.

The inner surface is a surface that receives illuminating light from the light scattering guide plate, and the outer surface is a surface from which the illuminating light is output externally.

(2) The rows of prism elements on the inner surface and the rows of prism elements or lens elements on the outer surface are aligned in directions (first and second directions) orthogonal to each other.

(3) The prism sheet is oriented such that the direction in which the rows of prism elements on the inner surface are aligned (the first direction) is in parallel with the incidence surface of the light scattering guide plate (perpendicular to the direction in which light is supplied). Under such a condition for orientation, the direction in which the rows of prism elements or lens elements on the outer surface are aligned (the second direction) is obviously perpendicular to the incidence surface of the light scattering guide plate (parallel with the direction in which light is supplied).

(4) The rows of prism elements or lens elements on the outer surface are formed such that light which has been guided in the forward direction within the prism sheet is shifted in a direction substantially perpendicular to the direction in which the light is supplied and then is returned toward the inner surface.

(5) When the outer surface is a prism surface, the rows of prism elements preferably have a prism apex angle in the range from 70° to 130°. The most preferable value of this angle is, for example, 96°.

(6) The rows of prism elements formed on the inner prism surface are constituted by repetitive patterns of a slope having a first relatively small angle of inclination and a slope having a second relatively large angle of inclination which are alternately arranged. Thus, the inner surface is a surface on which a multiplicity of asymmetric prism grooves aligned and formed.

(7) The slopes having the second angle of inclination of the rows of prism elements formed on the inner surface are directed toward the incidence surface. Under such a condition, the slopes having the first angle of inclination is obviously directed opposite with the incidence surface.

(8) The first relatively small angle of inclination is approximately 15°, and a preferable value of the second relatively large angle of inclination is approximately 32.5°.

(9) Preferably, thickness of the light scattering guide plate decreases as distance from the incidence surface increases. Typically, the light scattering guide plate has a wedge-shaped sectional configuration. A light supplying means is arranged along one of the end faces that define the larger thickness of the light scattering guide plate.

A surface light source device having the features as described in the above items (1) through (9) can be used for back-lighting of a liquid crystal panel in a well-known way of arrangement. The use of such back-lighting not only allows saving of electrical power but also provides a liquid crystal display having excellent visual quality.

A prism sheet in conformity with the above-described conditions (1) through (8) can be regarded as a novel optical functional device having an asymmetric prism surface. In comparison to the above-described double-sided prism sheet having a symmetric prism sheet (see Japanese Patent Application No. H7-213964), this asymmetric prism sheet is characterized in that it efficiently converts light incident upon slopes having a relatively small angle of inclination into light which is propagated in the direction of thickness.

The present invention further improves the characteristics of a surface light source device or a liquid crystal display according to the above-described second proposal (Japanese Patent Application No. H7-213964). Such an improvement of characteristics is based on the features of the asymmetric prism sheet proposed by the present invention.

Illuminating light emitted from the exiting surface of the light scattering guide plate is introduced into the asymmetric prism sheet through the slopes having a relatively small angle of inclination and is efficiently converted into light which is propagated in the direction of thickness of the prism sheet.

The light which has been subjected to the efficient directional conversion reaches the outer surface, is shifted in a direction perpendicular to the direction in which the light is supplied, and is then returned toward the light scattering guide plate. Meanwhile, as will be assumed from the description with reference to FIG. 3, a considerable part of light propagating in directions distributed around the preferred propagating direction of a representative beam is subjected to an action of converging light spreading in the transverse direction (a direction perpendicular to the direction in which the light is supplied) toward the forward direction to improve brightness as viewed from the forward direction.

A certain percentage of the representative beam which has been returned as described above is converted into light distributed around the representative beam by being passed through various paths and is eventually emitted from the outer surface of the prism sheet.

Such actions efficiently allow the beams of light eventually emitted from the outer surface of the asymmetric prism sheet to have a variety of histories, thereby improving the visual feel they give and suppressing reflective projection in the vicinity of the incidence surface.

BRIEF DESCRIPTION OF THE DRAWINGS

FIG. 5(*a*) shows propagation of light in a conventional symmetric prism sheet. FIG. 5(*b*) shows propagation of light in an asymmetric prism sheet according to the present invention.

FIG. 10(*b*) is a graph showing the result of similar measurement of angular characteristics exhibited in a section in the transverse direction made under the same conditions for measurement.

FIG. 17 illustrates the operation of rows of lens elements formed on an outer surface of a prism sheet having a prism surface and a lens surface.

FIG. 18 illustrates a configuration of lens elements of a prism sheet used in an arrangement from which the results of measurement shown in FIGS. 19(*a*) and 19(*b*) were obtained.

FIG. 19(*b*) is a graph showing angular characteristics exhibited in a section in the transverse direction.

BEST MODE FOR CARRYING OUT THE INVENTION

Figure 4:
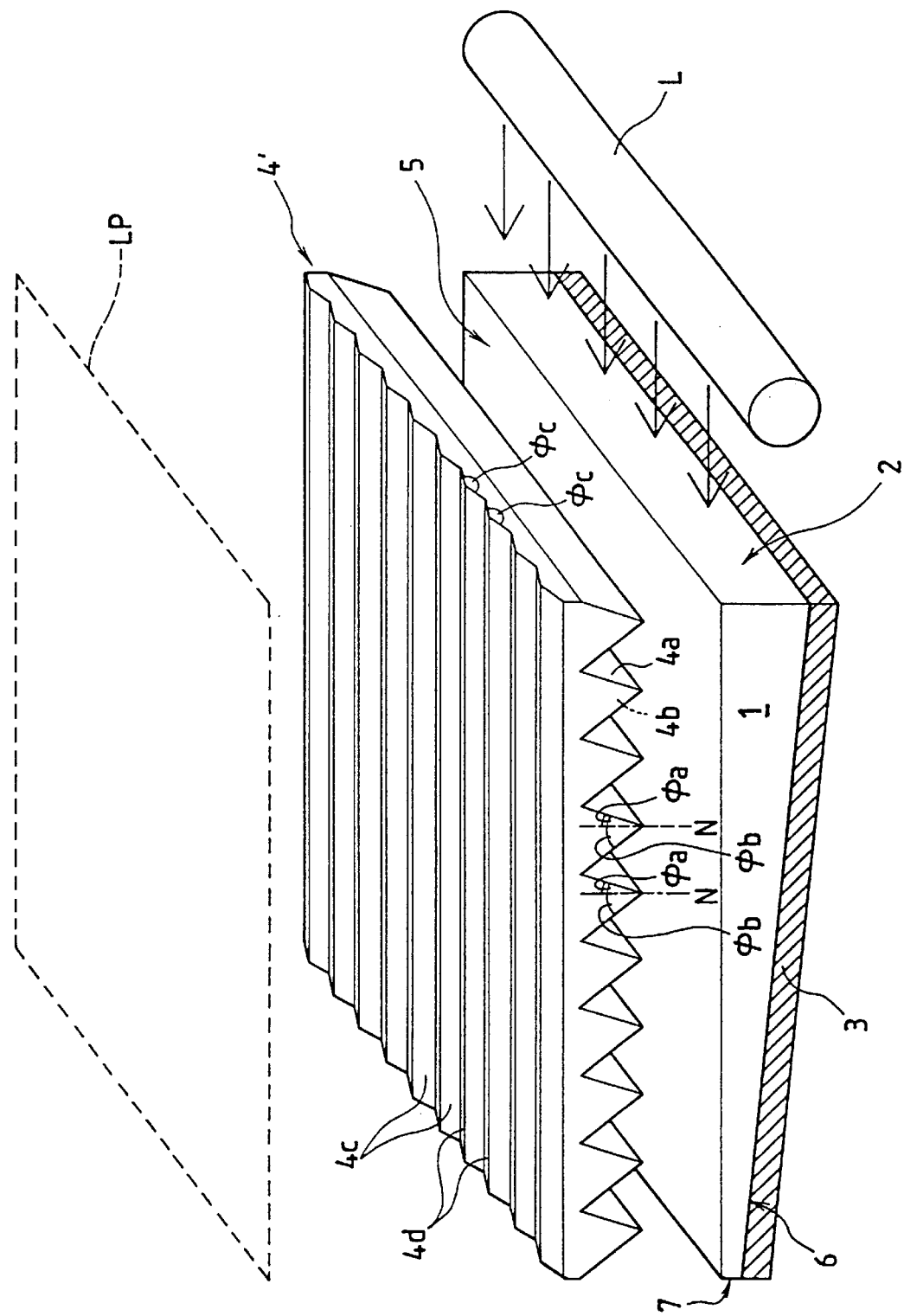
FIG. 4 is a view illustrating an embodiment of the present invention.

FIG. 4 shows a configuration of major parts of an embodiment of the present invention. For convenience of illustration, the interval between a light scattering guide plate and rows of prism elements and the pitch and depth of the rows of prism elements are exaggerated.

Figure 1:
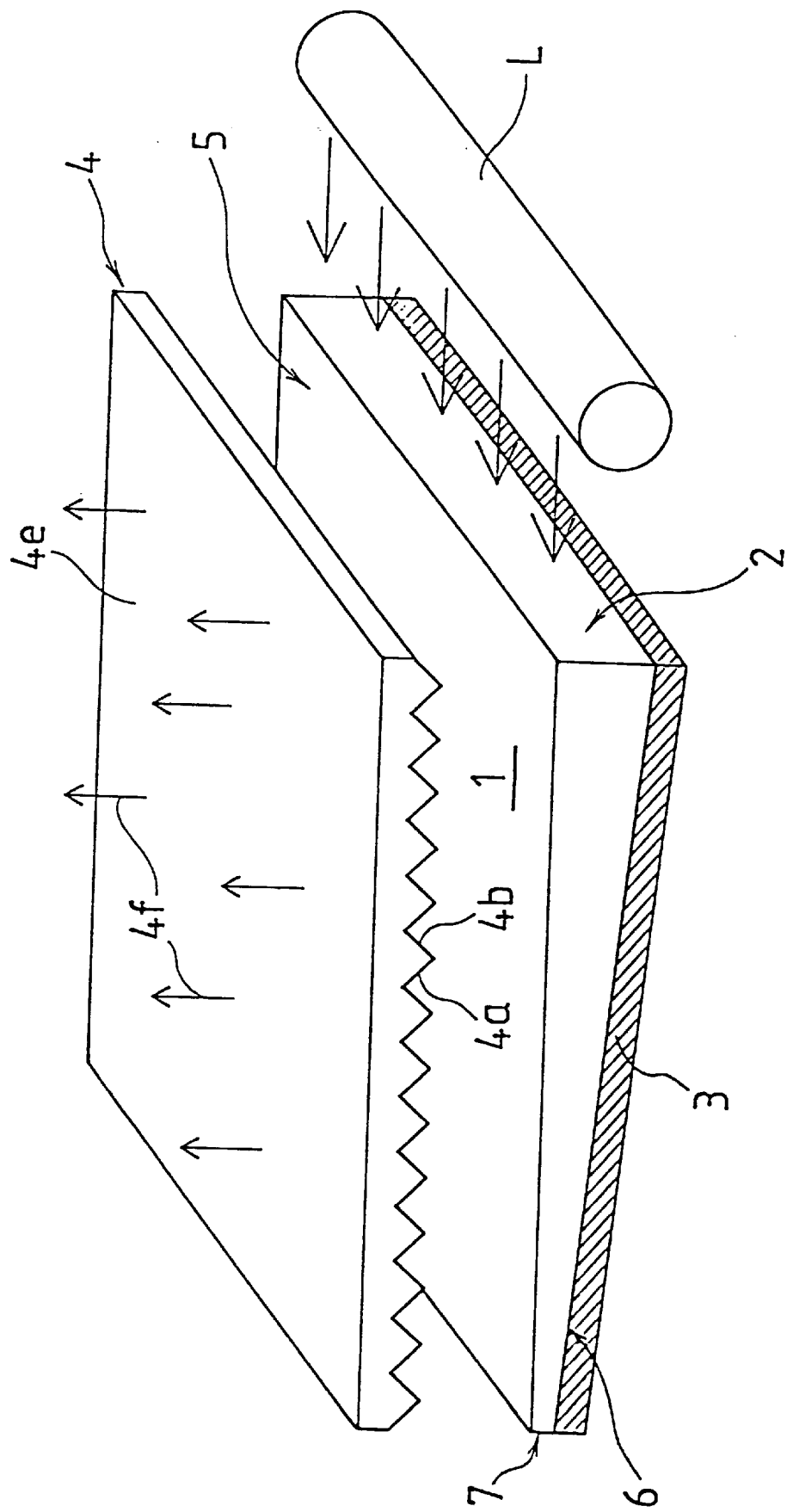
FIG. 1 is a view illustrating a configuration of a conventional surface light source device.
Figure 2:
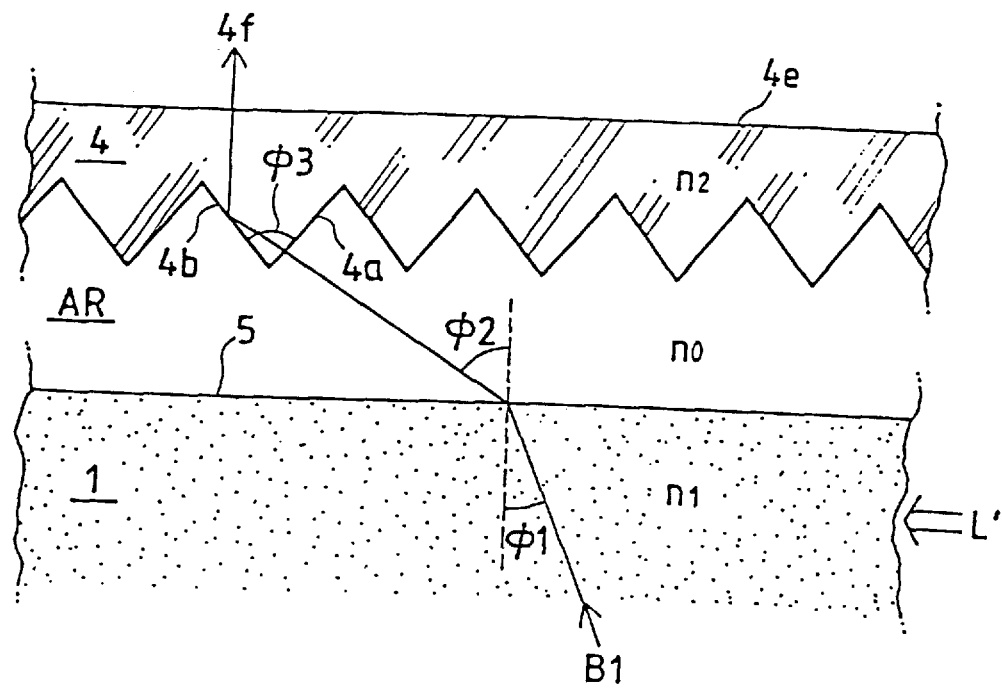
FIG. 2 illustrates the behavior of light in a section taken along the longitudinal direction of the configuration shown in FIG. 1.
Figure 3:
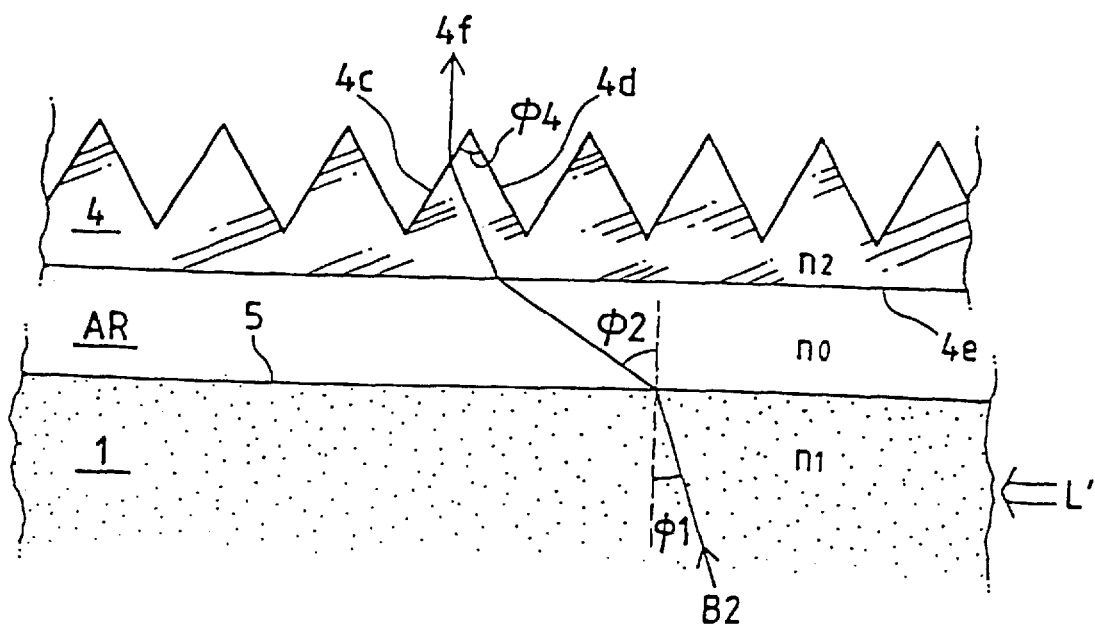
FIG. 3 is a sectional view illustrating the behavior of light in a configuration in which the prism sheet shown in FIG. 1 or 2 is reversed.

The present embodiment is a structure obtained by replacing the prism sheet 4 in the conventional surface light source device shown in FIG. 1 with a prism sheet 4' according to the present invention.

An end face that defines the larger thickness of a light scattering guide plate 1 having a wedge-shaped sectional configuration serves as an incidence surface 2, and a light source device (fluorescent lamp) L is arranged in the vicinity of the same. The rear surface of the light source device (fluorescent lamp) L is preferably surrounded by a reflector constituted by a sheet of silver foil or the like (not shown). A reflector 3 is arranged along a rear surface 6 of the light scattering guide plate 1. As the reflector 3, a sheet of silver foil having regular reflective properties or a white sheet having diffuse reflective properties is used.

Illuminating light is taken out from an exiting surface 5 of the light scattering guide plate 1. The asymmetric prism sheet 4' of a double orthogonal prism surface type is arranged outside the exiting surface 5. A liquid crystal display will be configured if a well-known liquid crystal display panel LP (indicated by the broken line) outside the prism sheet 4'.

Like the surface light source device shown in FIG. 1, thickness of the light scattering guide plate 1 decreases as distance from the incidence surface 2 increases. As described above, this improves light utilization efficiency and uniformity of luminance.

Light introduced into the light scattering guide plate 1 is guided toward an end face 7 that defines the larger thickness thereof while being subjected to scattering and reflection in the light scattering guide plate 1. During this process, illuminating light is gradually emitted from the exiting surface 5.

As described previously, the light emitted from the exiting surface 5 has a preferred propagating direction that depends on the particle diameter of particles of a different refractive index dispersed in the light scattering guide plate 1 (in general terms, correlation distance associated with the structure having a non-uniform refractive index). In other words, the exiting surface 5 emits a collimated illuminating beam.

The greater the diameter of the particles of a different refractive index dispersed in the light scattering guide plate 1 (in general terms, the greater the correlation distance associated with the structure having a non-uniform refractive index), the more sharply the light emitted from the exiting surface 5 is collimated. The preferred propagating direction (the primary propagating direction of the illuminating beam) is normally a direction that defines an upward angle of about 25° to 30° with the exiting surface as viewed from the incidence surface 2.

As in the prior art, the light scattering guide plate 1 may be formed from a material obtained, for example, by dispersing a material of a different refractive index (e.g., silicone type particles) uniformly in a matrix made of polymethyl methacrylate (PMMA). The percentage of the material of a different refractive index mixed (% by weight) is adjusted such that the light scattering guide plate 1 will have adequate scattering power.

In general, the greater the longitudinal size of the light scattering guide plate 1, the lower the percentage of the material of a different refractive index mixed therein. If the scattering power of the light scattering guide plate 1 is too high, it will hinder the propagation of light to regions apart from the incidence surface 2, which can result in gradient of brightness on the luminous surface.

Meanwhile, the particle size of the particles of a different refractive index is one of factors that determine the level of a forward scattering tendency during each process of scattering in the light scattering guide plate 1. In general, the greater the particle size, the stronger the forward scattering tendency. Therefore, if the particle size is relatively large, the preferred propagating direction of the beam emitted from the exiting surface 5 of the light scattering guide plate 1 is clearly defined to provide an illuminating beam which is similar to a collimated beam. Conversely, if the particle size is relatively small, the clearness of the preferred propagating direction of the beam emitted from the exiting surface 5 of the light scattering guide plate 1 is lost.

The particle size is preferably adjusted in accordance with the revel of directivity required for the illuminating beam. According to the present invention, no special restriction is placed on the composition of the material that forms the light scattering guide plate 1.

A description will now be made on the structure and function of the prism sheet 4' having prism surfaces on both sides thereof.

Referring to FIG. 4, slopes 4a and 4b as one unit are repeatedly formed on the inner surface of the prism sheet 4' to form rows of prism elements thereon, and slopes 4c and 4d as one unit are repeatedly formed on the outer surface to form rows of prism elements thereon. As in the prism sheet 4 shown in FIG. 1, the rows of prism elements formed on the inner surface extend in a direction in parallel with the incidence surface 2. On the other hand, the rows of prism elements formed on the outer surface extend in a direction perpendicular to the incidence surface 2.

It is important here that angles of inclination $\phi a$ and $\phi b$ of the slopes 4a and 4b, respectively, are designed such that a relationship expressed by $\phi a < \phi b$ is satisfied. In other words, a relationship expressed by $\phi a = \phi b$ which is satisfied in a symmetric prism sheet is not satisfied in an asymmetric prism sheet according to the present invention.

It should be noted that, in the context of this specification, the angles of inclination of the slopes 4a and 4b of the respective rows of prism elements are defined using the direction N of thickness of the prism sheet 4 as a reference (angle of inclination of 0°).

When the prism sheet 4' is assembled into the surface light source device, the orientation of slopes 4a is chosen such that a representative light beam corresponding to the preferred propagating direction of directive light emitted from the exiting surface 5 is primarily incident upon the slopes 4a.

Specifically, the slopes 4a is directed to the incidence surface 2, and the slopes 4b is directed opposite with the incidence surface 2. As a result, light incident upon the slopes 4a at an angle (a primary component of the light emitted from the exiting surface 5) is efficiently guided toward the forward direction in the prism sheet 4'.

Figure 5A:
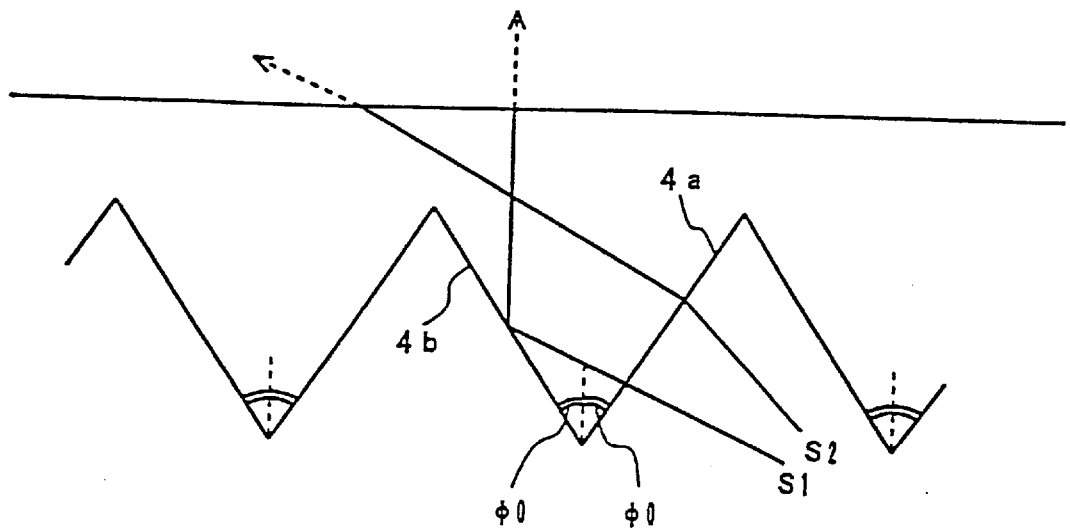
FIGS. 5(*a*) and 5(*b*) are views for explaining features of an asymmetric prism sheet according to the present invention.
Figure 5B:
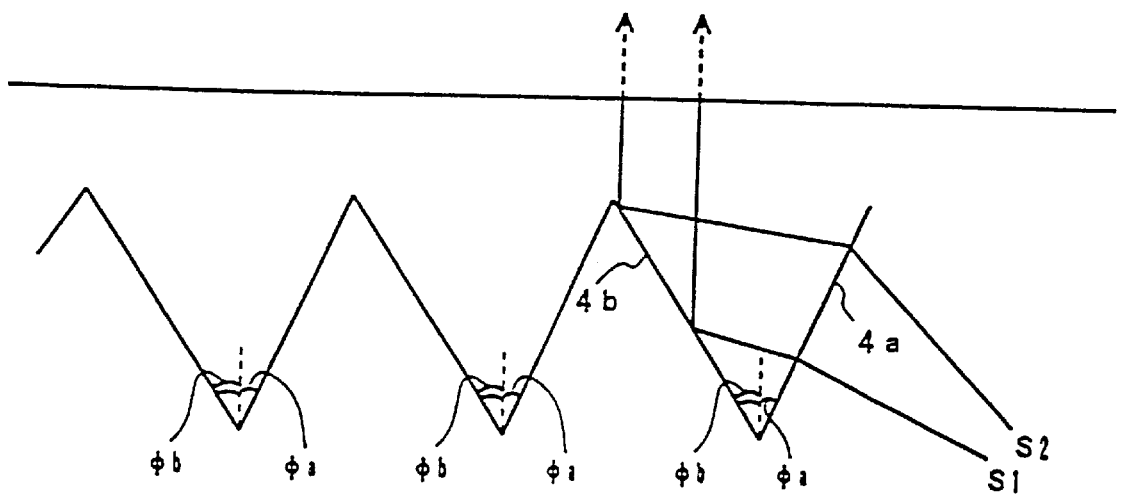

FIGS. 5(a) and 5(b) are views for explaining the reason for such an arrangement. FIG. 5(a) shows how beams S1 and S2 incident upon a symmetric prism sheet at an angle are propagated therein. FIG. 5(b) shows how beams S1 and S2 similar to those in FIG. 5(a) incident upon an asymmetric prism sheet according to the present invention at an angle are propagated therein.

The beams S1 and S2 give schematic representation of the spread of the propagating direction of light which is actually emitted from the exiting surface 5 and is incident upon a slope 4a. The diagonally incident beam S2 corresponds to a beam having a relatively small rising angle (propagating in a direction farther from the forward direction) while the diagonally incident beam S2 corresponds to a beam having a relatively large rising angle (propagating in a direction closer to the forward direction).

As shown in FIG. 5(a), the slopes 4a and 4b of the symmetric prism sheet has the same angle of inclination $\phi 0$. The angle of inclination $\phi 0$ is one-half of the prism apex angle and is typically approximately 30°. The beam S1 impinges upon one slope 4a and thereafter reaches another slope 4b easily to be subjected to directional conversion (total reflection) toward the forward direction.

On the other hand, the beam S2 can not impinge upon the slope 4b because it is subjected to insufficient refraction (refraction in a direction of reducing the rising angle) when it impinges upon the slope 4a. Thus, it is likely to directly travel to the outer prism surface.

Meanwhile, as shown in FIG. 5(b), the angles of inclination t $\phi a$ and $\phi b$ of the slopes 4a and 4b of the asymmetric prism sheet according to the present invention satisfy a relationship expressed by $\phi a < \phi b$. The angle of inclination $\phi b$ corresponds to the angle of inclination $\phi 0$ in FIG. 5(a). Therefore, $\phi b$ in FIG. 5(b) can be regarded substantially equal to $\phi 0$ and is typically approximately 30°. The beam S1 impinges upon one slope 4a and thereafter reaches another slope 4b easily to be subjected to directional conversion (total reflection) toward the forward direction. This is completely the same as the case shown in FIG. 5(a).

The beam S2 more easily impinges upon the slope 4b compared to that in FIG. 5(a) because it is subjected to a relatively higher degree of refraction (refraction in a direction of reducing the rising angle) when it impinges upon the slope 4a.

Therefore, the asymmetric prism sheet performs more efficient directional conversion toward the forward direction therein than that performed by the symmetric prism sheet arranged that the corresponding slopes 4b have substantially the same angle of inclination.

In other words, in order to improve the efficiency of directional conversion, it is more advantageous to make the angle of inclination $\phi a$ of the slope 4a upon which light is incident smaller than angle of inclination $\phi b$ of the slope 4b used for directional conversion ($\phi a < \phi b$) than designing the slopes 4a and 4b with equal angles of inclination.

Figure 6:
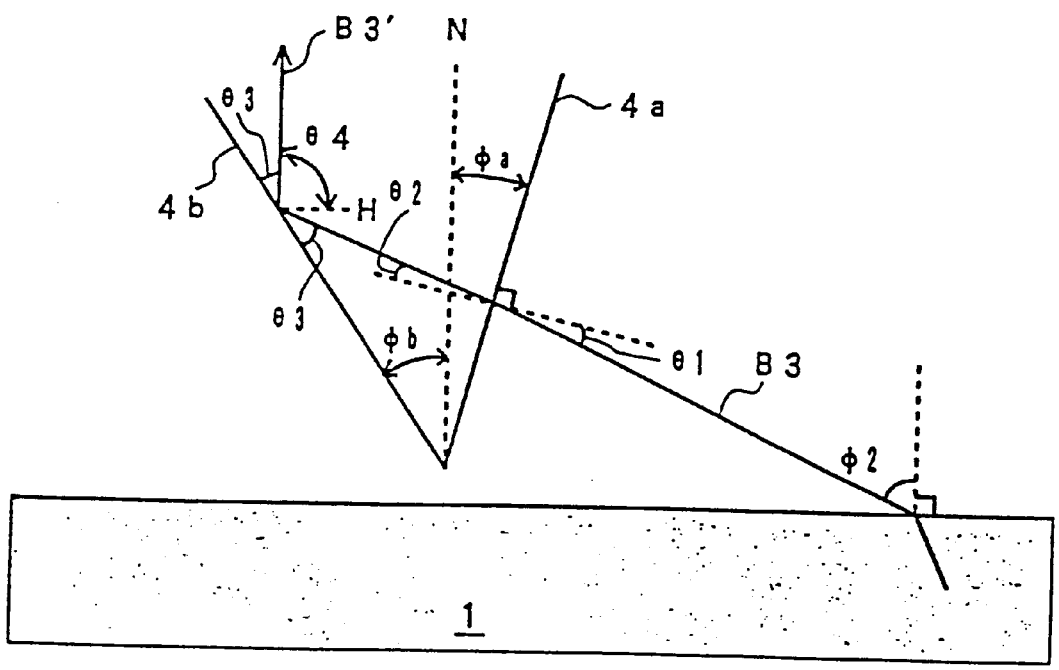
FIG. 6 illustrates examples of preferred angles of inclination φa and φb of an asymmetric prism sheet according to the present invention and operations of the same.

FIG. 6 shows examples of preferable angles of inclination φa and φb. The meaning and value of the reference number assigned to each of the angles shown in FIG. 6 are as follows.

φ2; Angle representing the propagating direction of a beam B3 representing light emitted from exiting surface 5. For example, φ2=approximately 63° when the matrix of the light scattering guide plate 1 is made of polymethyl methacrylate (PMMA whose refractive index is 1.492).

φa, φb; For example, angles of inclination φa=15° and φb=32.5° as measured from the reference direction (the direction of thickness of the prism sheet) N satisfy a condition that φ2=approximately 63°.

φ1; Angle of incidence of the representative beam B3 upon the slope 4a. φ1=approximately 12° under the condition described above.

φ2; Angle at which the representative beam B3 is refracted at the slope 4a. φ2=approximately 8üKunder the condition described above.

φ3; Angle at which the representative beam B3 is reflected (total reflection) by the slope 4b. φ3=approximately 34° under the condition described above.

φ4; Angle at which the representative beam B3 rises after being reflected (total reflection) by the slope 4b. φ4=approximately 91.5°((90°−32.5°)+34°) under the condition described above.

Figure 7:
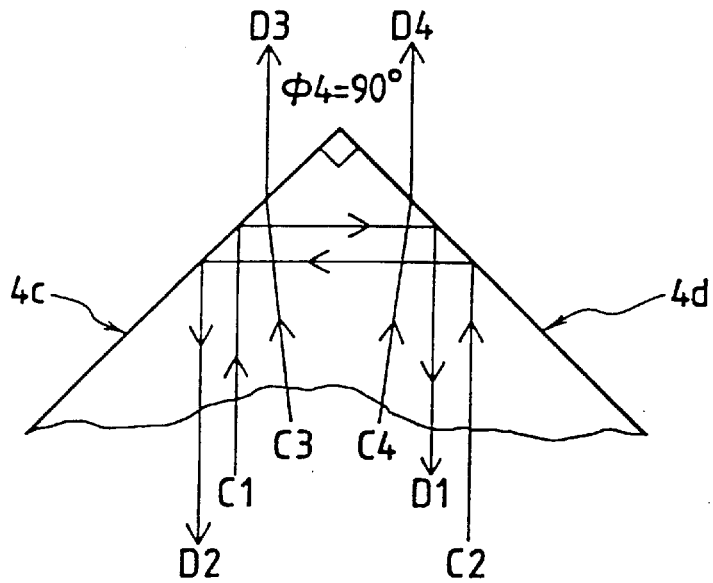
FIG. 7 illustrates the behavior of light around an outer prism surface of a prism sheet having a proper prism apex angle φ4.

FIG. 7 is a view illustrating the behavior of light around the outer surface of the prism sheet 4'. It shows a section of one of the rows of prism elements as viewed from the light source device, and representative beams propagating in the prism sheet 4' toward the forward direction are indicated by reference symbols C1 and C2.

If the prism apex angle φ4 of the rows of prism elements on the outer surface is about 90°, all or most of the light represented by the representative beams C1 and C2 is subjected to internal reflection (which is normally total reflection) by the slopes 4c and then 4d or by the slopes 4d and then 4c to be shifted in the lateral direction and becomes return beams (beams traveling in the reverse direction) D1 and D2.

Figure 9:
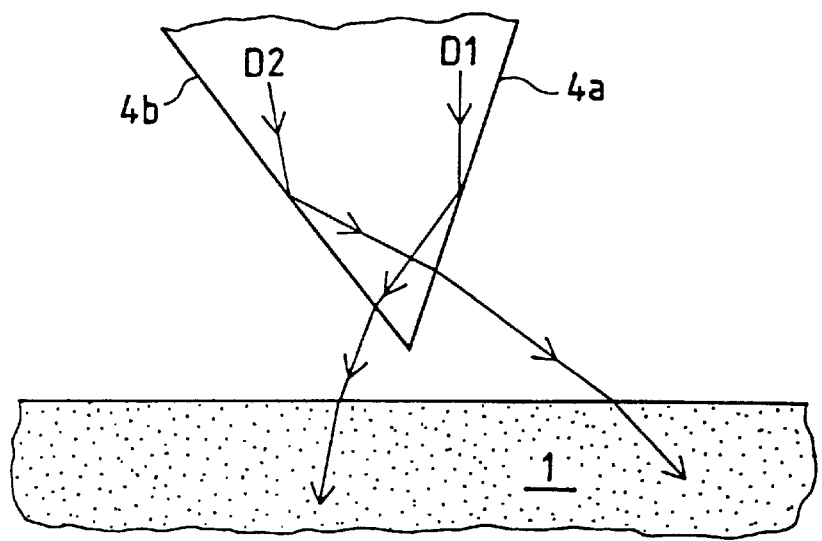
FIG. 9 illustrates the behavior of returned beams D1 and D2 around an inner prism surface.

FIG. 9 is a view illustrating the behavior of the return beams D1 and D2 around the inner surface. Most part of the return beams is returned into the light scattering guide plate 1. The light returned into the light scattering guide plate 1 is subjected to a second scattering action in the light scattering guide plate 1 and a reflecting action by the rear surface 6 or reflector 3 and is thereafter emitted again from the exiting surface 5 of the light scattering guide plate 1 to be incident upon the prism sheet 4' again.

In this process, light passes through a great variety of paths. Therefore, when the light is incident upon the prism sheet 4' again, the propagating direction of the light has been considerably expanded. A considerable part of the light is incident upon the slope 4c or 4d at slight angles as indicated by C3 and C4 and is emitted therefrom as beams D3 and D4 in the forward direction.

Thus, by forming the outer surface of the prism sheet 4' as a prism surface, it is possible to prevent light from being directly emitted from the prism sheet 4' without following any return path.

In other words, beams emitted from the same microscopic region on the outer surface of the prism sheet 4' will have a variety of path histories and, as a result, uniform and soft illuminating light is produced. Especially, the generation of uneven luminance due to reflective projection is prevented in regions near the incidence surface by suppressing direct emission of strong components in the propagating direction.

FIGS. 7 and 9 are based on an assumption that the representative beams C1 and C2 propagate substantially in the forward direction and that the prism apex angle φ4 is approximately 90°. However, a similar effect can be expected even if the propagating direction of the representative beams C1 and C2 and the prism apex angle φ4 deviate from such conditions to some extent.

One practical range for the prism apex angle φ4 is from 70° to 130°. A prism apex angle smaller than 70° will result in a considerable reduction of the converging effect which converge the propagating direction of light toward the forward direction in a plane in the transverse direction, thereby reducing the luminance of the surface light source device.

If the prism apex angle φ1 is too large, a major part of the representative beams C1 and C2 that travels substantially in the forward direction is directly emitted from the slopes 4c and 4d. As a result, diversification of the path history of the light emitted from the prism sheet 4' can not be expected.

Figure 8:
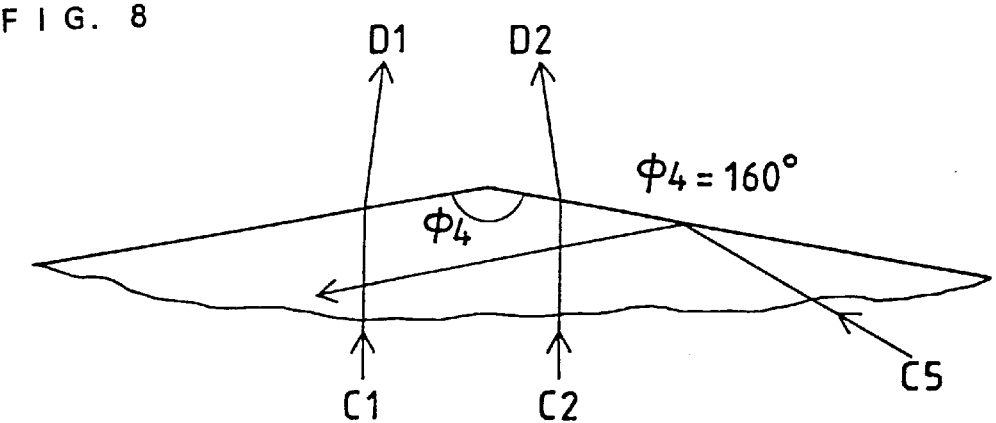
FIG. 8 illustrates the behavior of light around the outer prism surface of the prism sheet when the prism apex angle φ4 is too large.

FIG. 8 shows an example of such a situation with reference to a case wherein φ4=160°. Referring to FIG. 8, a major part of the representative beams C1 and C2 that travels substantially in the forward direction is directly emitted from the slopes 4c and 4d as emitted beams D1 and D2.

Reverse propagation (return) due to total reflection occurs for an incident beam at an angle as indicated by the reference symbol C5, and this contributes little to the diversification of the path history of the light emitted from the prism sheet 4'.

Figure 10A:
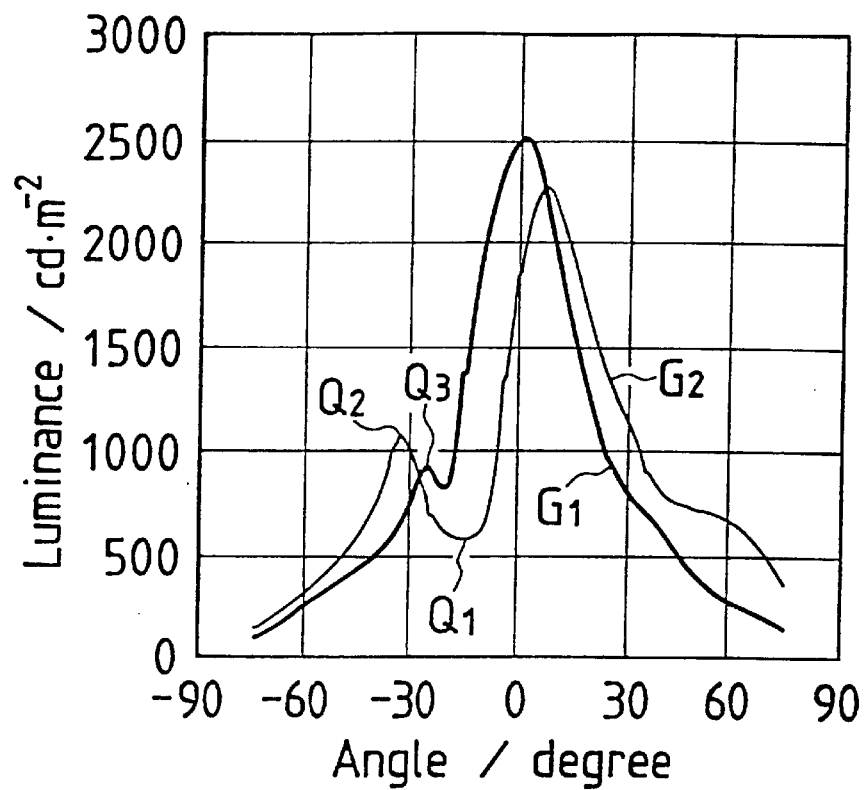
FIG. 10(*a*) is a graph showing the result of measurement of angular characteristics of illuminating light in a section taken in the longitudinal direction of a symmetric prism sheet made on the configuration shown in FIG. 4 under conditions as shown in FIG. 6.
Figure 10B:
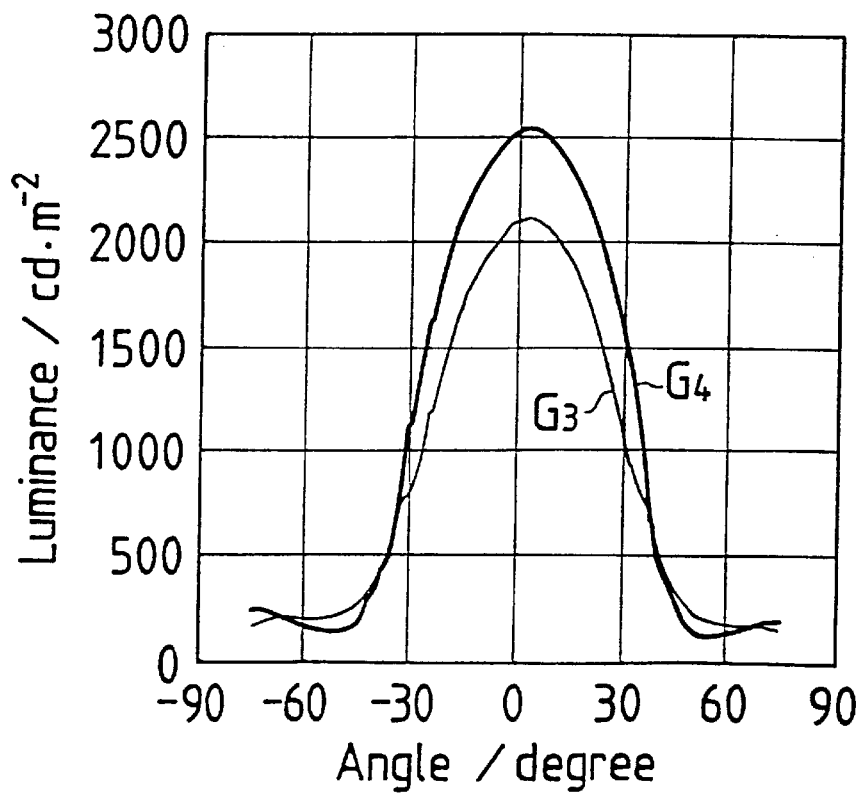

FIGS. 10(a) and 10(b) are graphs showing the results of measurement on angular characteristics on illuminating light in the configuration shown in FIG. 4 under the conditions shown in FIG. 6. Both of those graphs also show the results of measurement made on a symmetric prism sheet instead of an asymmetric prism sheet under the same conditions for measurement. Further, FIG. 11 is a graph showing angular characteristics obtained on the configuration from which the graphs in FIGS. 10(a) and 10(b) have been obtained with the prism sheets removed in order to clarify the action of the prism sheet 4'.

In each of those graphs, the ordinate axis represents the luminance of the luminous surfaces (the outer surfaces of the prism sheets 4 and 4') measured by cd (candela)/m², and the abscissa axis represents the direction in which the luminance is measured (the direction of the line of sight of the luminance meter). Referring to FIGS. 10(a) and 11, angular scan in the direction of the line of sight of the luminance meter was performed in a section of the light scattering guide plate 1 in the longitudinal direction thereof. Referring to FIG. 10(b), angular scan in the direction of the line of sight of the luminance meter was performed in a section of the light scattering guide plate 1 in the transverse direction thereof. In either of those graphs, the angle 0° represents the forward direction.

Figure 11:
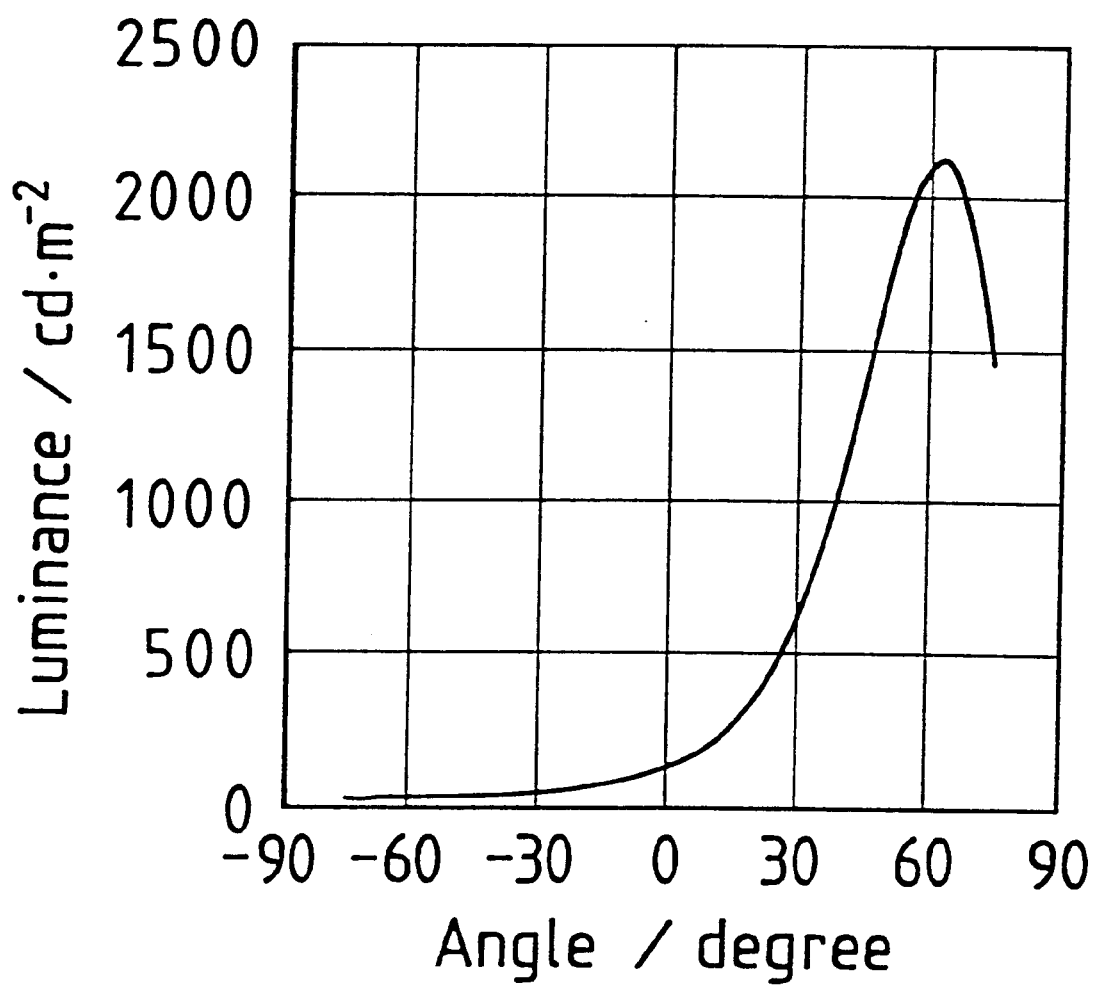
FIG. 11 is a graph showing angular characteristics measured on a configuration which is the same as that arranged the results shown in FIGS. 10(*a*) and 10(*b*) except that the prism sheet is removed.

As indicated by the graph in FIG. 11, the light scattering guide plate including a matrix made of polymethyl methacrylate (PMMA whose refractive index is 1.492) has a clear peak of emitted light in the direction of approximately 63° in the longitudinal section.

In FIG. 10(a), the curve G1 represents the result of scan in the same longitudinal section in the configuration from which the result shown in FIG. 11 was obtained with an asymmetric prism sheet (φa=15°, φb=32.5°) added thereto. The curve G2 represents the result of scan in the same longitudinal section in the configuration from which the result shown in FIG. 11 was obtained with a symmetric prism sheet (having a prism apex angle of 65°) added thereto.

Similarly, in FIG. 10(b), the curve G3 represents the result of scan in the transverse section in the configuration from which the result shown in FIG. 11 was obtained with an asymmetric prism sheet (φa=15°, φb=32.5°) added thereto, and the curve G4 represents the result of scan in the same transverse section in the configuration from which the result shown in FIG. 11 was obtained with a symmetric prism sheet (having a prism apex angle of 65üK) added thereto.

The followings will be apparent from those results of measurement.

(1) In either of the longitudinal and transverse directions, the symmetric or asymmetric prism sheet provides illuminating light having a peak substantially in the forward direction.

(2) However, as appreciated by comparing the curves G1 and G3 with the curves G2 and G4, the asymmetric prism sheet provides a peak luminance value with is 10 to 20 percent higher than that available with the symmetric prism sheet.

(3) The curve G2 in the graph of FIG. 10(a) exhibits a reduction in luminance Q1 in a direction relatively close to the forward direction (in the vicinity of −15°) and conversely exhibits an increase in luminance Q2 in a direction relatively far from the forward direction (in the vicinity of −40üK). Meanwhile, such an unpreferable characteristics are almost eliminated from the curve G1 for the asymmetric prism sheet leaving only a slight trace Q3.

It is apparent from the above that the configuration employing an asymmetric prism sheet exhibits considerable improvement over the configuration employing a symmetric prism sheet in terms of both the luminance in the peak direction (substantially forward direction) and the shape of the luminance curve.

The present, invention accommodates surface light source devices or liquid crystal displays in various other configurations. For example, various modifications are possible with respect to the shape of the light scattering guide plate 1 and the number and form of the light source device L. FIGS. 12 through 15 show examples of such modifications in the form of schematic partial views. The structures, positions, functions, orientation and the like of the asymmetric prism sheet and other components will not be described to avoid repetition.

Figure 12:
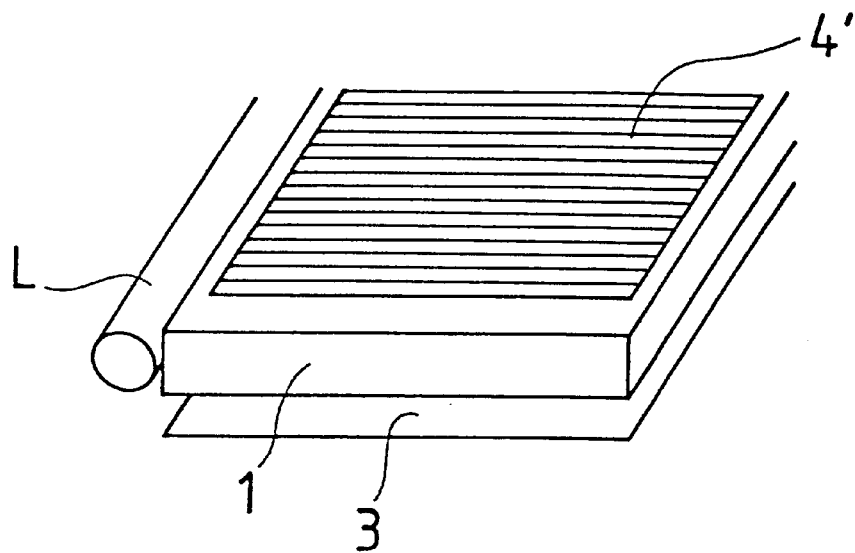
FIG. 12 is a schematic partial view illustrating a first alternative embodiment of the present invention.

FIG. 12 shows a configuration in which a light scattering guide plate 1 in the form of a flat plate is employed and a light source device L is arranged along one end face thereof (a first alternative embodiment). It is different from the embodiment shown in FIG. 4 only in the sectional configuration of the light scattering guide plate 1.

Figure 13:
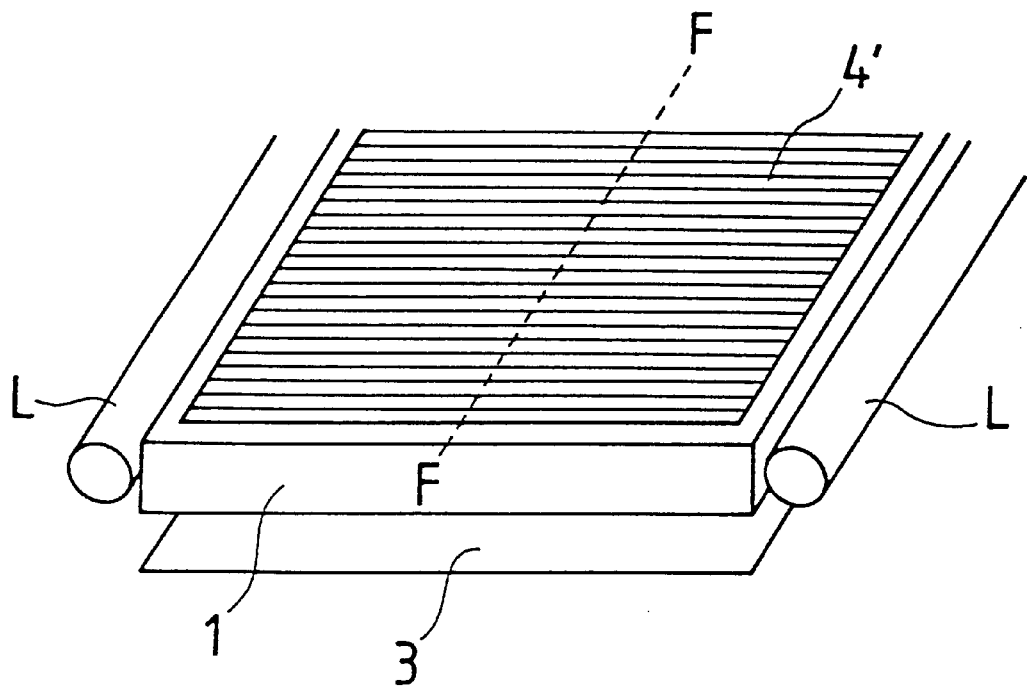
FIG. 13 is a schematic partial view illustrating a second alternative embodiment of the present invention.

In the configuration shown in FIG. 13, a light scattering guide plate 1 in the form of a flat plate is employed and two light source devices L are arranged at opposite end faces thereof (a second alternative embodiment). It is different from the embodiment shown in FIG. 4 in the sectional configuration of the light scattering guide plate 1 and the number of the light source devices L used.

Another difference is that the orientation of the slopes on the inner surface of the prism sheet 4' has been reversed about the center line F—F. Specifically, slopes at a smaller angle of inclination are formed so as to face the right-hand side light source device L on the right side of the center line F—F, and slopes at a smaller angle of inclination are formed so as to face the left-hand side light source device L on the left side of the center line F—F.

Figure 14:
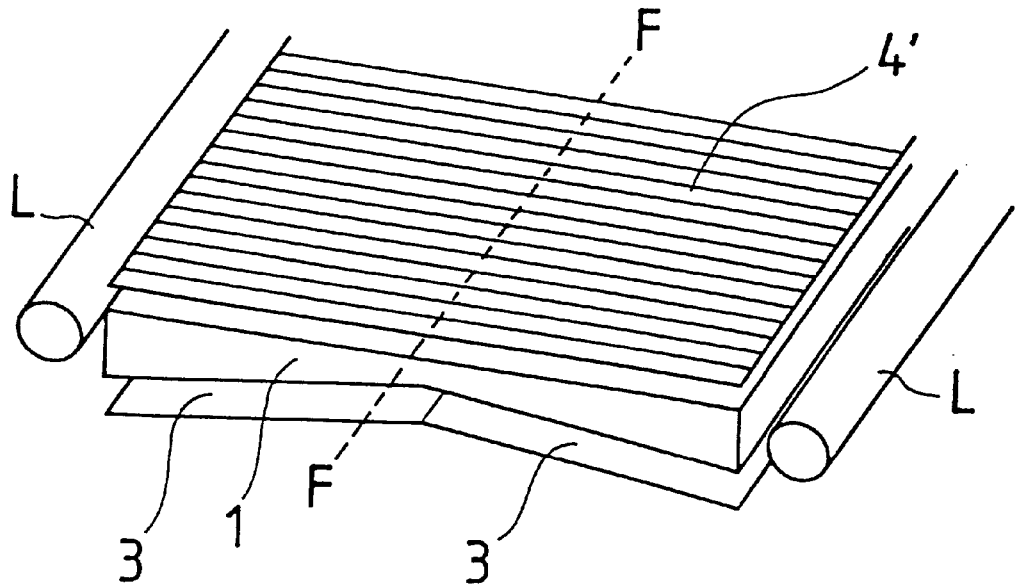
FIG. 14 is a schematic partial view illustrating a third alternative embodiment of the present invention.

In the configuration shown in FIG. 14, a light scattering guide plate 1 is used which has a sectional configuration which is a combination of linear wedge-like configurations in an abutting relationship (a third alternative embodiment). One each light source device L is arranged on both ends thereof. As in the case shown in FIG. 14, the orientation of the slopes on the inner surface of the prism sheet 4' has been reversed about the center line F—F. Specifically, slopes at a smaller angle of inclination are formed so as to face the right-hand side light source device L on the right side of the center line F—F, and slopes at a smaller angle of inclination are formed so as to face the left-hand side light source device L on the left side of the center line F—F.

Figure 15:
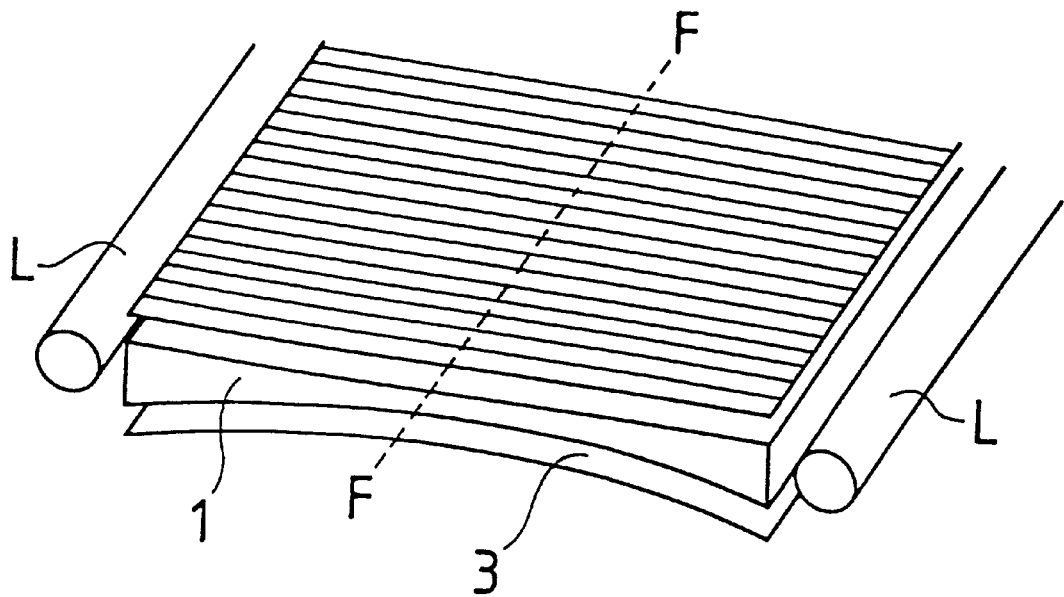
FIG. 15 is a schematic partial view illustrating a fourth alternative embodiment of the present invention.

In the configuration shown in FIG. 15, the rear surface of the light scattering guide plate 1 has an arch-like configuration on both sides of which two light source devices L are arranged (a fourth alternative embodiment).

In this case, the orientation of the slopes on the inner surface of the prism sheet 4' has been again reversed about the center line F—F. Specifically, slopes at a smaller angle of inclination are formed so as to face the right-hand side light source device L on the right side of the center line F—F, and slopes at a smaller angle of inclination are formed so as to face the left-hand side light source device L on the left side of the center line F—F.

The prism sheets used in the embodiments described above are of the double orthogonal prism surface type having prism surfaces formed with a multiplicity of rows of prism elements on both sides thereof. However, it is not essential that the outer surface of such a prism sheet is a prism sheet.

A basic optical function required for the outer surface of a prism sheet is to shift a beam in a lateral direction and to convert the direction of the beam toward the inner surface thereafter (to generate a return light component). Therefore, the rows of prism elements on the outer surface of the double orthogonal prism surface type prism sheet 4' employed in the above-described embodiments may be replaced with rows of lens elements that provide effects like prism elements.

Figure 16:
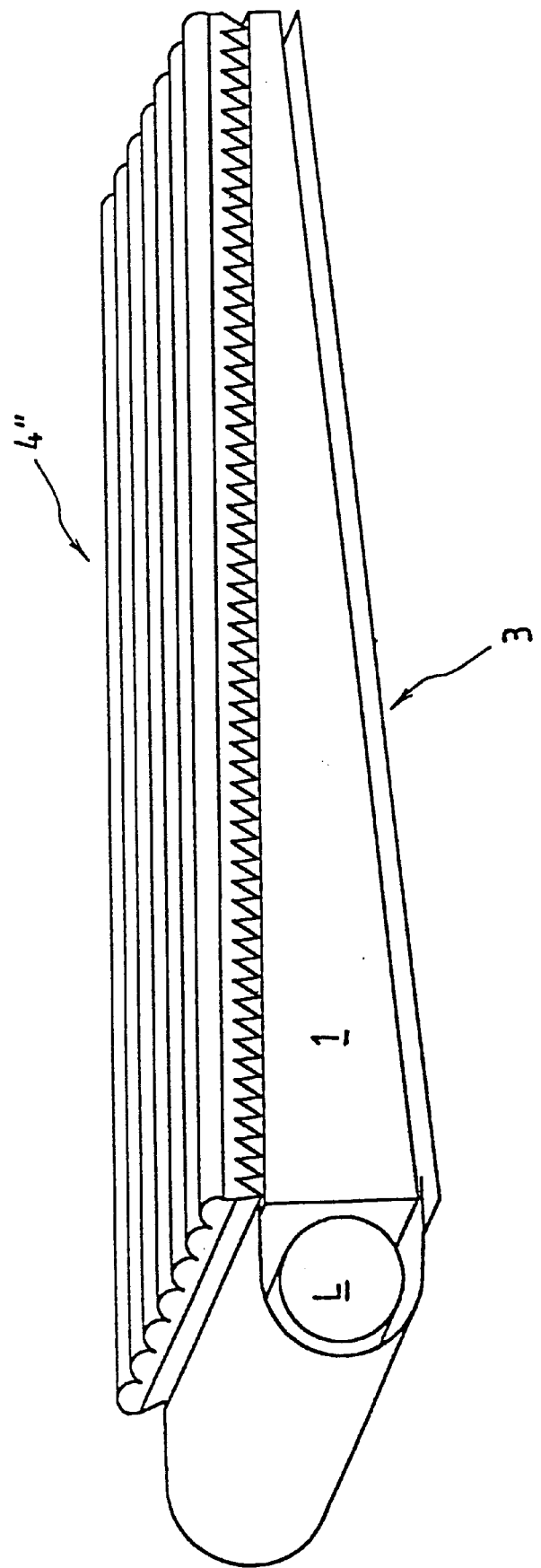
FIG. 16 is a view illustrating a fifth alternative embodiment of the present invention which employs a prism sheet having a prism surface and a lens array surface.

FIG. 16 is a view illustrating a fifth alternative embodiment of the present invention employing such a prism sheet having a prism surface and a lens array surface. As in FIG. 4, for convenience in illustration, the interval between the light scattering guide plate and the rows of the prism sheet and the pitch and depth of the rows of prism elements are exaggerated.

The fifth embodiment of the invention corresponds to a configuration obtained by replacing the asymmetric prism sheet 4' of the double orthogonal prism surface type having rows of prism elements on both sides thereof in the embodiment shown in FIG. 4 with a prism sheet 4" of the prism surface-lens array surface type.

A light source device (fluorescent lamp) L is arranged along a light incidence surface that defines the larger thickness of a light scattering guide plate 1 having a wedge-shaped sectional configuration. The prism sheet 4" is oriented such that the rows of lens elements formed on the outer surface thereof extend in a direction substantially perpendicular to the incidence surface (light source device L).

The configuration and function of the components other than the prism sheet 4" are the same as those in the embodiment shown in FIG. 4 and will not be described here to avoid repetition. It is the same as the configuration shown in FIG. 4 that a liquid crystal display is configured by providing a well-known liquid crystal display panel LP (not shown) outside the prism sheet 4".

Light introduced into the light scattering guide plate 1 is guided toward an end face that defines the larger thickness thereof while being subjected to scattering and reflection in the light scattering guide plate 1 and reflection at a reflector 3. During this process, illuminating light is gradually emitted toward the prism sheet 4".

The structure of the prism sheet 4" and the structure and function of the inner surface (asymmetric prism surface) are generally the same as those of the prism sheet 4' and therefore will not be described here to avoid repetition.

Quite briefly, rows of asymmetric prism elements as shown in FIG. 5(*b*) or FIG. 6 are repeatedly formed on the inner surface of the prism sheet 4". As previously mentioned, the action of such rows of prism elements efficiently produces light that travels in the prism sheet 4" toward the forward direction.

As in the case of the prism sheet 4', the light that travels in the prism sheet 4" toward the forward direction eventually reaches the inner surface of the rows of lens elements formed on the outer surface of the prism sheet 4".

FIG. 17 illustrates a general configuration of the rows of lens elements formed on the outer surface of the prism sheet 4" of the prism surface-lens array surface type and the behavior of light around the rows of lens elements in the same manner as in FIG. 7. Referring to FIG. 17, there is shown a section of one of the rows of lens elements as viewed from the light source device L, and representative beams that propagates in the prism sheet 4" toward the forward direction are indicated by the reference symbols C1 and C2.

The representative beam C1 represents light that propagates in a plane in the transverse direction toward the forward direction, and the representative beam C2 represents light that propagates in a plane in the transverse direction in a direction which is at a slight angle with respect to the forward direction.

The rows of lens elements generally has a semicylindrical profile and includes a convex curved surface at least in a part thereof. In this embodiment, there is arranged a convex curved surface which is smooth around the top. All or most of the lens elements may be formed as convex curved surfaces. Further, a concave curved surface may be arranged at the valley between adjoining rows of lenses.

A major part of a representative beam C1 incident in the vicinity of such a top portion is emitted in the forward direction as an illuminating beam D1. On the contrary, a considerable or major part of a representative beam C1 incident upon a region apart from the top is shifted in the transverse direction due to internal reflection depending on the angle of incidence and is subjected to second internal reflection to produce a return beam D1.

Further, a major part of a representative beam C2 incident in the vicinity of such the top is emitted diagonally in a plane in the transverse direction as an illuminating beam D1. A considerable or major part of a representative beam C2 incident upon a region apart from the top is shifted in the transverse direction due to internal reflection depending on the angle of incidence although the light path is slightly different from that for the representative beam C1 and is subjected to second internal reflection to produce a return beam D1.

The behavior of the return beams D1 and D2 around the inner surface is similar to that in the prism sheet 4'. Specifically, as described with reference to FIG. 9, a major part of the return beams is returned into the light scattering guide plate 1. The light returned into the light scattering guide plate 1 is again subjected to scattering in the light scattering guide plate 1 and reflection at the rear surface or the reflector 3 and thereafter is emitted again from the exiting surface of the light scattering guide plate 1 to be incident upon the prism sheet 4" again.

During this process, there is a great variety of light paths and hence the propagating direction of the light has been considerably expanded when it impinges upon the prism sheet 4" again. Therefore, the distribution of the light paths for the light that reimpinges is expanded in the transverse plane, and this increases components in diagonal directions as represented by the representative beams C2 in FIG. 17.

Thus, a mechanism that is similar to the prism sheet 4 provides diverse light paths based on the generation of return beams. In other words, beams emitted from the same microscopic region on the outer surface of the prism sheet 4" toward the forward direction (in a plane in the longitudinal direction) will have a variety of path histories and, as a result, uniform and soft illuminating light is produced.

Especially, the generation of uneven luminance due to reflective projection is prevented in regions near the incidence surface by suppressing direct emission of strong components in the propagating direction.

Various modification may be made on the surface light source device shown in FIG. 16 as in the case of configurations employing a double orthogonal prism sheet. For example, in the alternative configurations according to the above-described second through fourth embodiments (see FIGS. 12 through 15), the double orthogonal prism surface type prism sheet 4' may be replaced with a prism sheet of the prism surface-lens array surface type.

Figure 19A:
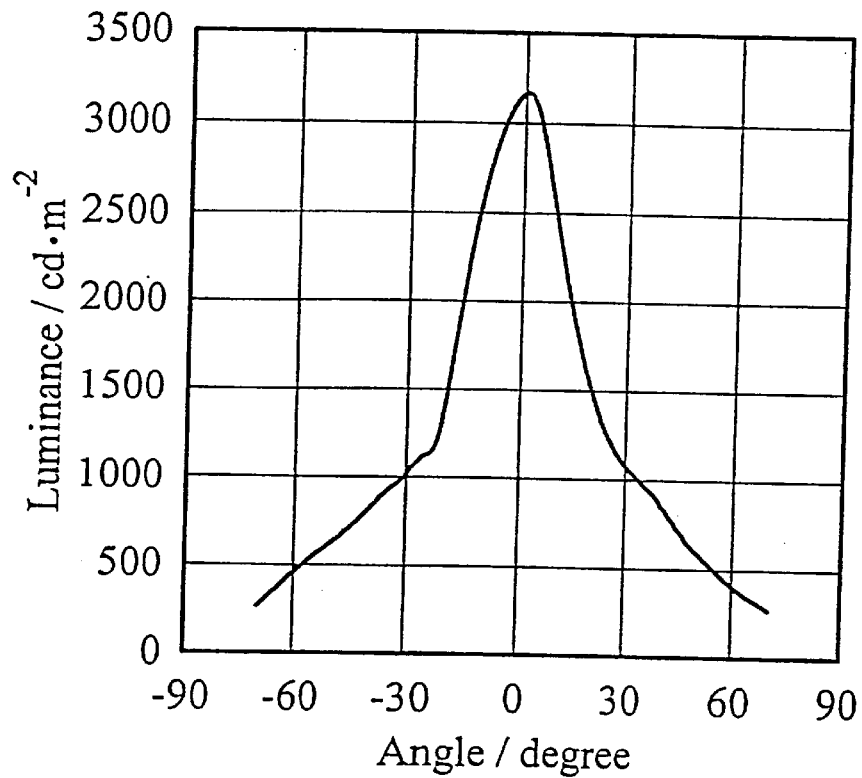
FIG. 19(*a*) is a graph showing angular characteristics of illuminating light in a section taken in the longitudinal direction of the configuration shown in FIG. 16 under conditions as shown in FIG. 6.
Figure 19B:
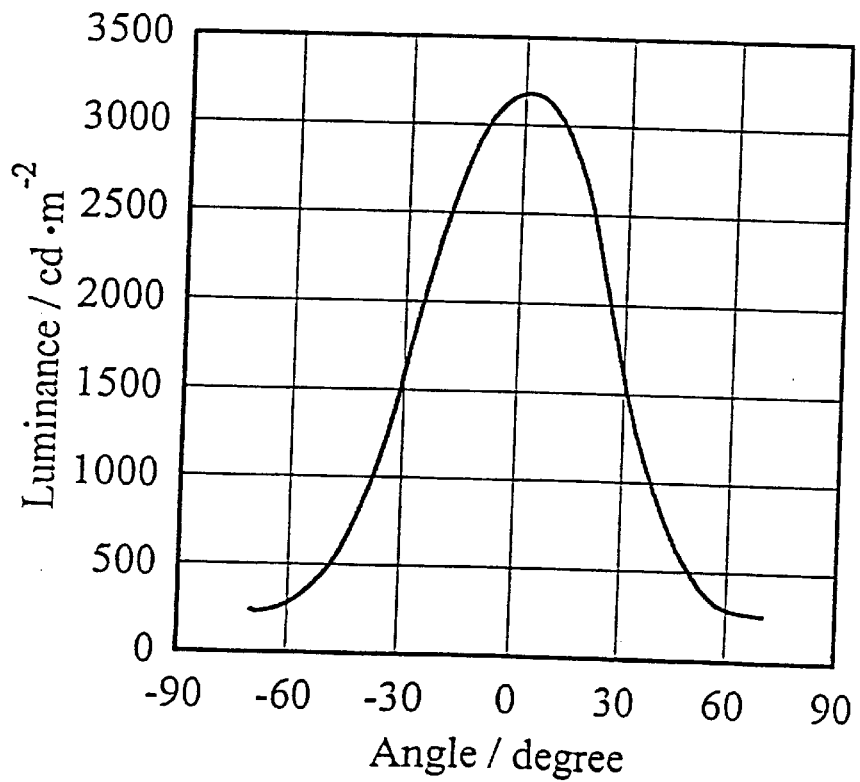

FIGS. 19(*a*) and 19(*b*) are graphs showing the results of measurement of angular characteristics of illuminating light in the configuration shown in FIG. 16. A light scattering guide plate 1 of a standard size of 4 inches was employed. The conditions for the inner surface (prism surface) of the prism sheet 4" are the same as the conditions shown in FIG. 6. Further, the conditions for the outer surface (lens array surface) of the prism sheet 4" are the same as the conditions shown in FIG. 18.

Specifically, a tangential angle of 60° is arranged on both edge portions of each row of lens elements, and a convex curved surface having a gradient which is smoothly reduced toward the top is arranged.

In each of those graphs, the ordinate axis represents the luminance of the luminous surface (the outer surface of the prism sheets 4") measured by cd (candela)/$m^2$, and the abscissa axis represents the direction in which the luminance is measured (the direction of the line of sight of the luminance meter). Referring to FIG. 19(*a*), angular scan in the direction of the line of sight of the luminance meter was performed in a section of the light scattering guide plate 1 in the longitudinal direction thereof. Referring to FIG. 19(*b*), angular scan in the direction of the line of sight of the luminance meter was performed in a section of the light scattering guide plate 1 in the transverse direction thereof. In either of those graphs, the angle 0° represents the forward direction.

The followings will be apparent from those results of measurement.

(1) In either of the longitudinal and transverse directions, there is arranged illuminating light having a clear peak substantially in the forward direction.

(2) Further, in either of the longitudinal and transverse directions, the luminance curve has a well-adjusted profile having an appropriate breadth and high symmetry.

It is apparent from the above that the prism sheet 4" of the prism surface-lens array surface type exhibits excellent characteristics in terms of both the luminance in the peak direction (substantially forward direction) and the shape of the luminance curve like the above-described asymmetric prism sheets.

Finally, a supplemental description will be made on materials for the prism sheet and light scattering guide plate used in the present invention and a method of manufacturing the same.

Various materials utilizing polymer materials as a base (matrix) can be used for the prism sheet and light scattering guide plate used in the present invention. Tables 1 and 2 show typical matrix materials.

TABLE 1

| category | name of polymer | refractive index |
|---|---|---|
| MA | 1. PMMA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylmethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-b-butyl acrylate] | 1.4535 |
| XA | 18. PBzMA [polybenzyl acrylate] | 1.5584 |
| | 19. Poly(2-ClEA) [poly-2-chloroethyl acrylate] | 1.52 |

TABLE 2

| category | name of polymer | refractive index |
|---|---|---|
| AC | 20. PVAc [polyvinyl acetate] | 1.47 |
| XA | 21. PVB [polyvinyl benzoate] | 1.578 |
| | 22. PVAc [polyvinyl phenyl acetate] | 1.567 |
| | 23. PVClAc [polyvinyl chloroacetate] | 1.512 |
| N | 24. PAN [polyacrylonitrile] | 1.52 |
| | 25. Poly(αMAN) [poly-α-methyl acrylonitrile] | 1.52 |
| α-A | 26. PMA(2Cl) [polymethyl-α-chloroacrylate] | 1 5172 |
| St | 27. Poly(o-ClSt) [poly-o-chlorostyrene] | 1.6098 |
| | 28. Poly(p-FSt) [poly-p-fluorostyrene] | 1.566 |
| | 29. Poly(o, p-FSt) [poly-o-, p-diflurostyrene] | 1.475 |
| | 30. Poly(p-iPSt) [poly-p-isopropyl styrene] | 1.554 |
| | 31. PSt [polystyrene] | 1.59 |
| C | 32. PC [polycarbonate] | 1.59 |

Those materials may be used as they are because a prism sheet is normally a transparent element. If flat surfaces of the prism sheet are to be finished like satin, well-known blast processing may be used. Well-known plastic film forming techniques may be employed to form a prism surface having a desired prism apex angle and a lens array surface having a desired shape. A light scattering guide plate utilizing a polymer material as a base can be manufactured using the following manufacturing methods.

One of the methods is to use a molding process including a step of mixing and milling two or more kinds of polymers. Two or more kinds of polymer materials in arbitrary configurations (e.g., pellets) having refractive indices different from each other are mixed, heated and milled (mixing and milling step). The liquid material which has been mixed and milled are injected into a metal mold of an injection molder at a high pressure and is cooled and solidified to produce a molded product. The shape of the metal mold is designed so as to provide a desired light scattering guide plate.

The two or more kinds of polymers having different refractive indices which have been subjected to mixing and milling are not mixed with each other completely before they are solidified. As a result, they are solidified with non-uniformity (fluctuation) of local concentrations to provide the molded product with uniform scattering power.

The mixed and milled material may be injected into a cylinder of an extrusion molder and extruded in a normal manner to provide a desired molded product.

A great variety of choices are available for the combination and mixing ratio of such a polymer blend, and it is preferable to pay consideration to the refractive index of each material and strength and properties of the structure having non-uniform refractive indices produced by the molding process (scattering and illumination parameter E, correlation distance a, root mean square i of fluctuation of permittivity).

Typical polymer materials which can be used are as shown in Tables 1 and 2.

According to another method of manufacturing materials that form a light scattering guide plate, a material in the form of particles having a refractive index different from that of a polymer material is uniformly dispersed in the polymer material (the difference in refractive index is 0.001 or more).

Method usable for uniform dispersion of a material in the form of particles include suspension polymerization. According to this method, a material in the form of particles is added to a monomer, and a polymerizing reaction is caused with the material in the form of particles suspended in hot water to disperse the material in the form of particles uniformly, thereby providing a polymer material. Molding may be performed on such a raw material to manufacture a light scattering guide plate having a desired configuration.

Suspension polymerization may be performed on various combinations of materials in the form of particles and monomers (combinations of concentrations of particles, particle size, refractive indices, and the like) to provide a plurality of kinds of materials. Those materials may be selectively blended and molded to manufacture light scattering guide plates having various characteristics. The concentration of particles can be easily controlled by blending a polymer that does not include any material in the form of particles.

Another method usable for uniform dispersion of a material in the form of particles is to mix and mill a polymer material and a material in the form of particles. In this case, milling and molding (pelletizing) may be again performed on various combinations of materials in the form of particles and monomers (combinations of concentrations of particles, particle size, refractive indices, and the like). Those materials may be selectively blended and molded to manufacture light scattering guide plates having various characteristics.

Further, the process of blending polymers and the process of mixing a material in the form of particles as described above may combined. For example, when polymers having different refractive indices are blended and milled, a material in the form of particles may be mixed therein. Since those manufacturing methods are well-known, detailed description on manufacturing conditions and the like will be omitted.

The features of the present invention described in detail above can be summarized as follows.

(1) There is arranged a surface light source device having an improved level of brightness as viewed in a primary viewing direction (substantially forward direction).

(2) There is arranged a surface light source device in which the level of brightness smoothly decreases with increase in an angular deviation from the primary viewing direction (substantially forward direction) and in which the output of illuminating light is suppressed in viewing directions in which viewing is less likely to take place to avoid useless illumination.

(3) Such improvements of characteristics improves applicability of a surface light source device to back-lighting of a liquid crystal display.

(4) The present invention provides a novel asymmetric prism sheet which can be used for such surface light source devices or liquid crystal displays.

We claim:

1. A surface light source device comprising:

a light scattering guide plate;

a primary light source means arranged on the side of said light scattering guide plate for supplying light toward an incidence surface of said light scattering guide plate;

a prism sheet arranged along an exiting surface of said light scattering guide plate; and a reflector arranged along a surface opposite with said exiting surface, wherein:

said prism sheet includes an inner surface having rows of prism elements aligned in a first direction and an outer surface having rows of refractive elements aligned in a second direction perpendicular to said first direction, said first direction being oriented in parallel with said incidence surface of said light scattering guide plate;

said rows of refractive elements are formed such that a beam which has been guided in a forward direction within said prism sheet is shifted in a direction in parallel with said incidence surface and is then directed toward said inner surface;

said rows of prism elements on said inner surface are constituted by alternate repetition of slopes having a first relatively small angle of inclination and a slope having a second relatively large angle of inclination; and said slope having the first angle of inclination is directed toward said incidence surface, and said slope having the second angle of inclination is directed opposite with said incidence surface.

2. A surface light source device comprising:

a light scattering guide plate;

a primary light source means arranged on the side of said light scattering guide plate for supplying light toward an incidence surface of said light scattering guide plate;

a prism sheet arranged along an exiting surface of said light scattering guide plate; and a reflector arranged along a surface opposite with said exiting surface, wherein:

said prism sheet includes an inner surface having rows of prism elements aligned in a first direction and an outer surface having rows of prism elements aligned in a second direction perpendicular to said first direction, said first direction being oriented in parallel with said incidence surface of said light scattering guide plate;

said rows of prism elements on said outer surface are formed such that a beam which has been guided in a forward direction within said prism sheet is shifted in a direction in parallel with said incidence surface and is then directed toward said inner surface;

said rows of prism elements on said inner surface are constituted by alternate repetition of a slope having a first relatively small angle of inclination and a slope having a second relatively large angle of inclination; and said slope having the first angle of inclination is directed toward said incidence surface, and said slope having the second angle of inclination is directed opposite with said incidence surface.

3. The surface light source device according to claim 2, wherein a prism apex angle of said rows of prism elements formed on said outer prism surface is approximately 96°.

4. The surface light source device according to claim 2, wherein the prism apex angle of said rows of prism elements formed on said outer prism surface is in the range from 70° to 130°.

5. A surface light source device comprising:

a light scattering guide plate;

a primary light source means arranged on the side of said light scattering guide plate for supplying light toward an incidence surface of said light scattering guide plate;

a prism sheet arranged along an exiting surface of said light scattering guide plate; and a reflector arranged along a surface opposite with said exiting surface, wherein:

said prism sheet includes an inner surface having rows of prism elements aligned in a first direction and an outer surface having rows of lens elements aligned in a second direction perpendicular to said first direction, said first direction being oriented in parallel with said incidence surface of said light scattering guide plate;

said rows of lens elements on said outer surface are formed such that a beam which has been guided in a forward direction within said prism sheet is shifted in a direction in parallel with said incidence surface and is then directed toward said inner surface;

said rows of prism elements on said inner surface are constituted by alternate repetition of a slope having a first relatively small angle of inclination and a slope having a second relatively large angle of inclination; and said slope having the first angle of inclination is directed toward said incidence surface, and said slope having the second angle of inclination is directed opposite with said incidence surface.

6. The surface light source device according to any one of claims 1 through 5, wherein thickness of said light scattering guide plate tends to decrease as distance from said incidence surface increases.

7. The surface light source device according to any one of claims 1 through 5, wherein said second relatively large angle of inclination is approximately 32.5°.

8. The surface light source device according to any one of claims 1 through 5, wherein said first relatively small angle of inclination is approximately 15° and said second relatively large angle of inclination is approximately 32.5°.

9. A liquid crystal display comprising:

a liquid crystal panel; and a surface light source device arranged for back-lighting, wherein:

said surface light source device comprises a light scattering guide plate, a primary light source means arranged on the side of said light scattering guide plate for supplying light toward an incidence surface of said light scattering guide plate, a prism sheet arranged along an exiting surface of said light scattering guide plate, and a reflector arranged along a surface opposite with said exiting surface;

said prism sheet includes an inner surface having rows of prism elements aligned in a first direction and an outer surface having rows of refractive elements aligned in a second direction perpendicular to said first direction, said first direction being oriented in parallel with said incidence surface of said light scattering guide plate;

said rows of refractive elements are formed such that a beam which has been guided in a forward direction within said prism sheet is shifted in a direction in parallel with said incidence surface and is then directed toward said inner surface;

said rows of prism elements on said inner surface are constituted by alternate repetition of a slope having a first relatively small angle of inclination and a slope having a second relatively large angle of inclination; and said slope having the first angle of inclination is directed toward said incidence surface, and said slope having the second angle of inclination is directed opposite with said incidence surface.

10. A liquid crystal display comprising:

a liquid crystal panel; and a surface light source device arranged for back-lighting, wherein:

said surface light source device comprises a light scattering guide plate, a primary light source means arranged on the side of said light scattering guide plate for supplying light toward an incidence surface of said light scattering guide plate, a prism sheet arranged along an exiting surface of said light scattering guide plate, and a reflector arranged along a surface opposite with said exiting surface;

said prism sheet includes an inner surface having rows of prism elements aligned in a first direction and an outer surface having rows of prism elements aligned in a second direction perpendicular to said first direction, said first direction being oriented in parallel with said incidence surface of said light scattering guide plate;

said rows of prism elements on said outer surface are formed such that a beam which has been guided in a forward direction within said prism sheet is shifted in a direction in parallel with said incidence surface and is then directed toward said inner surface;

said rows of prism elements on said inner surface are constituted by alternate repetition of a slope having a first relatively small angle of inclination and a slope having a second relatively large angle of inclination; and said slope having the first angle of inclination is directed toward said incidence surface, and said slope having the second angle of inclination is directed opposite with said incidence surface.

11. The liquid crystal display according to claim 10, wherein a prism apex angle of said rows of prism elements formed on said outer prism surface is approximately 96°.

12. The liquid crystal display according to claim 10, wherein the prism apex angle of said rows of prism elements formed on said outer prism surface is in the range from 70° to 130°.

13. A liquid crystal display comprising:

a liquid crystal panel; and a surface light source device arranged for back-lighting, wherein:

said surface light source device comprises a light scattering guide plate, a primary light source means arranged on the side of said light scattering guide plate for supplying light toward an incidence surface of said light scattering guide plate, a prism sheet arranged along an exiting surface of said light scattering guide plate, and a reflector arranged along a surface opposite with said exiting surface;

said prism sheet includes an inner surface having rows of prism elements aligned in a first direction and an outer surface having rows of lens elements aligned in a second direction perpendicular to said first direction, said first direction being oriented in parallel with said incidence surface of said light scattering guide plate;

said rows of lens elements on said outer surface are formed such that a beam which has been guided in a forward direction within said prism sheet is shifted in a direction in parallel with said incidence surface and is then directed toward said inner surface;

said rows of prism elements on said inner surface are constituted by alternate repetition of a slope having a first relatively small angle of inclination and a slope having a second relatively large angle of inclination; and said slope having the first angle of inclination is directed toward said incidence surface, and said slope having the second angle of inclination is directed opposite with said incidence surface.

14. The liquid crystal display according to any one of claims 9 through 13, wherein thickness of said light scattering guide plate tends to decrease as distance from said incidence surface increases.

15. The liquid crystal display according to any one of claims 9 through 13, wherein said second relatively large angle of inclination is approximately 32.5°.

16. The liquid crystal display according to any one of claims 9 through 13, wherein said first relatively small angle of inclination is approximately 15° and said second relatively large angle of inclination is approximately 32.5°.

17. A prism sheet comprising:

a first prism surface having rows of prism elements aligned in a first direction; and a second prism surface having rows of prism elements aligned in a second direction perpendicular to said first direction, wherein:

said rows of prism elements on said second prism surface have a prism apex angle such that a beam which has been guided substantially in a forward direction within said prism sheet is shifted in said first direction and is then returned toward said first prism surface; and said rows of prism elements on said first prism surface are constituted by alternate repetition of a slope having a first relatively small angle of inclination and a slope having a second relatively large angle of inclination.

18. The prism sheet according to claim 17, wherein said second relatively large angle of inclination is approximately 32.5°.

19. The prism sheet according to claim 17 or 18, wherein said first relatively small angle of inclination is approximately 15° and said second relatively large angle of inclination is approximately 32.5°.

20. The prism sheet according to any one of claims 17 through 18, wherein said prism apex angle of said rows of prism elements on said second prism surface is approximately 96°.

21. The prism sheet according to any one of claims 17 through 18, wherein said prism apex angle of said rows of prism elements on said second prism surface is in the range from 70° to 130°.

22. A prism sheet comprising:

a first surface having rows of prism elements aligned in a first direction; and a second surface having rows of lens elements aligned in a second direction perpendicular to said first direction, wherein:

said rows of lens elements on said second surface are formed such that a beam which has been guided substantially in a forward direction within said prism sheet is shifted in said first direction and is then directed toward said first surface; and said rows of prism elements on said first surface are constituted by alternate repetition of a slope having a first relatively small angle of inclination and a slope having a second relatively large angle of inclination.

23. The prism sheet according to claim 22, wherein said second relatively large angle of inclination is approximately 32.5°.

24. The prism sheet according to claim 22 or 23, wherein said first relatively small angle of inclination is approximately 15° and said second relatively large angle of inclination is approximately 32.5°.

* * * * *